(12) United States Patent
Bassill et al.

(10) Patent No.: US 12,477,629 B2
(45) Date of Patent: Nov. 18, 2025

(54) INDUCTION HEATING SYSTEM

(71) Applicant: Hatco Corporation, Milwaukee, WI (US)

(72) Inventors: Nick Bassill, Milwaukee, WI (US); Jackey Chen, Milwaukee, WI (US); Fei Shang, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 892 days.

(21) Appl. No.: 17/717,439

(22) Filed: Apr. 11, 2022

(65) Prior Publication Data
US 2022/0330388 A1 Oct. 13, 2022

(30) Foreign Application Priority Data
Apr. 12, 2021 (CN) .......................... 202110391691.2

(51) Int. Cl.
*H05B 6/06* (2006.01)
*A47J 36/24* (2006.01)
(Continued)

(52) U.S. Cl.
CPC .......... *H05B 6/065* (2013.01); *A47J 36/2483* (2013.01); *A47J 36/32* (2013.01);
(Continued)

(58) Field of Classification Search
CPC .... A47J 2202/00; A47J 36/2483; A47J 36/32; A47J 43/044; A47J 43/0711; A47J 47/01; H01L 2224/48091; H01L 2224/48465; H01L 2224/78; H01L 2224/78301; H01L 2224/78621; H01L 2224/78822; H01L 2224/85; H01L 2224/85205; H01L 24/78;
(Continued)

(56) References Cited

U.S. PATENT DOCUMENTS 10,980,371 B2 \* 4/2021 Tsui ..................... A47J 37/0857
11,439,272 B2 9/2022 Wang et al.
(Continued)

FOREIGN PATENT DOCUMENTS

| CN | 102652460 | 8/2012 |
|---|---|---|
| CN | 103404230 A | 11/2013 |
| WO | WO-2011/070785 | 6/2011 |

*Primary Examiner* — Quang T Van
(74) *Attorney, Agent, or Firm* — Foley & Lardner LLP

(57) ABSTRACT

An induction system includes a single power inverter, a plurality of power branches coupled to the single power inverter in parallel, and a controller. Each of the plurality of power branches includes an induction coil, a capacitor coupled to the induction coil to form a resonant circuit, and a power switch coupled in series with the resonant circuit. The controller is configured to regulate an output power of the resonant circuit of each of the plurality of power branches by varying a switching frequency of the single power inverter to adjust the output power of the resonant circuit of all of the plurality of power branches and/or selectively transmitting a signal to the power switch of a respective power branch of the plurality of power branches to turn-on and turn-off the power switch of the respective power branch to individually adjust the output power of each of the plurality of power branches.

16 Claims, 30 Drawing Sheets

(51) Int. Cl.
*A47J 36/32* (2006.01)
*A47J 43/044* (2006.01)
*A47J 43/07* (2006.01)
*A47J 47/01* (2006.01)
*H02J 50/40* (2016.01)
*H05B 6/10* (2006.01)
*H05B 6/12* (2006.01)
*H05B 6/44* (2006.01)

(52) U.S. Cl.
CPC ......... *A47J 43/044* (2013.01); *A47J 43/0711* (2013.01); *A47J 47/01* (2013.01); *H02J 50/40* (2016.02); *H05B 6/108* (2013.01); *H05B 6/1272* (2013.01); *H05B 6/44* (2013.01); *A47J 2202/00* (2013.01); *H05B 2213/04* (2013.01); *H05B 2213/07* (2013.01)

(58) Field of Classification Search
CPC . H01L 2924/01004; H01L 2924/01005; H01L 2924/01006; H01L 2924/01033; H01L 2924/01079; H01L 2924/01082; H01L 2924/014; H01L 2924/12041; H01L 2924/14; H02J 50/40; H05B 2213/03; H05B 2213/04; H05B 2213/05; H05B 2213/07; H05B 6/06; H05B 6/065; H05B 6/107; H05B 6/108; H05B 6/12; H05B 6/1272; H05B 6/44; Y02B 40/00
USPC ....... 219/627, 620, 622, 626, 630, 635, 660, 219/661, 662, 667, 670, 671, 672
See application file for complete search history.

(56) References Cited

U.S. PATENT DOCUMENTS

| | | |
|---|---|---|
| 2006/0286255 A1 | 12/2006 | Xu et al. |
| 2012/0093996 A1 | 4/2012 | Martin et al. |
| 2012/0152935 A1* | 6/2012 | Kitaizumi .............. H05B 6/065 219/661 |
| 2014/0014647 A1* | 1/2014 | Brosnan ................ H05B 6/062 219/600 |
| 2016/0029439 A1* | 1/2016 | Kurose ................. H05B 6/065 219/626 |
| 2019/0343339 A1 | 11/2019 | Ikuta |
| 2022/0175183 A1 | 6/2022 | Roever et al. |

* cited by examiner

INDUCTION HEATING SYSTEM

CROSS-REFERENCE TO RELATED PATENT APPLICATION

This application claims the benefit of and priority to Chinese Patent Application No. 202110391691.2, filed Apr. 12, 2021, which is incorporated herein by reference in its entirety.

TECHNICAL FIELD

This application involves induction heating technology, especially an induction warming and heating system and appliance.

BACKGROUND

Induction heating technology is a novel heating technology that is efficient, safe, and clean, and is often used in heating and warming food. Current induction heating systems usually involve one coil working with one power inverter to form a heating platform. The power inverter, coil, control system, and other parts are placed together in one case, where the material of the case varies with different appliances (such as black metal or non-ferrous metal). The coil is often positioned at one side of the case (either top, bottom, left or right), and uses an induction field to heat surrounding area.

Induction heating theory uses electromagnetic induction where high frequency alternating current ("AC") flowing through the coil delivers an alternating magnetic field, which induces eddy current in metal vessels (such as pot, plate, etc.) and generate heat in the vessels due to the joule heating effect. Specifically, in the operation of induction heating systems, the coil induces eddy current in the nearby vessel surface and creates heat. The surface of the vessel can be designed as flat (such as plate) or curved (such as pot).

Current inducting heating systems suffer from several deficiencies. First, with a single coil the induction heating systems can only heat at a dedicated position. It is not able to provide controllable heat at multiple locations of the same vessel or heat multiple vessels at the same time. Second, current induction heating systems use duty cycle control to send power to separate coils or require separate inverters to heat separate coils. Such a control structure significantly complicates the system circuitry, increasing the cost of the maintenance for the system. Without independent control of each coil, current induction heating systems, such as a griddle, consume large amounts of energy to heat up a large area when only a small area may be needed. Moreover, current induction heating systems often use the main control unit and its peripherals to control the coil, heating nearby vessels, but some vessels uses material such as aluminum or copper, which is not suitable for induction heating. Current induction heating systems have limitations in detecting the material of the vessels such that non-compatible materials can be heated, which is easy to cause damage to the circuitry and can cause safety concerns for operators of the appliances and the appliances themselves.

SUMMARY

This induction heating system of the present disclosure provides an improved solution relative to current systems with complex circuit structure, low efficiency of heating, and safety issues for the system and operator thereof when heating with vessels of non-compatible materials.

A first embodiment of the present disclosure relates to an induction heating appliance. The induction heating appliance includes at least one of a griddle or a three-dimensional container, a plurality of induction coils, one or more capacitors, at least two power switches, a single power inverter, and a controller. The at least one of the griddle or the three-dimensional has a surface defining a plurality of different heating zones including at least a first heating zone and a second heating zone. The first heating zone and the second heating zone are disposed in different locations on the surface. The plurality of induction coils include a first induction coil and a second induction coil. The first induction coil is positioned to individually heat the first heating zone of the surface. The second induction coil is positioned to individually heat the second heating zone of the surface. The first induction coil and the second induction coil are each electrically connected in series with the one or more capacitors to form a resonant circuit. The resonant circuit of the first induction coil and the resonant circuit of the second induction coil are each electrically connected in series with one of the at least two power switches to form at least two power branches. The at least two power branches are electrically connected in parallel with the single power inverter. The controller is configured to provide a signal to the single power inverter to selectively and individually (a) turn on or turn off the at least two power branches or (b) adjust a switching frequency of the power inverter.

A second embodiment of the present disclosure relates to an induction heating system. The induction heating system includes a plurality of induction coils, one or more capacitors, at least two power switches, a single power inverter, and a controller. The plurality of induction coils include a first induction coil and a second induction coil. The first induction coil and the second induction coil are each electrically connected in series with the one or more capacitors to form a resonant circuit. The resonant circuit of the first induction coil and the resonant circuit of the second induction coil are each electrically connected in series with one of the at least two power switches to form at least two power branches. The at least two power branches are electrically connected in parallel with the power inverter. The controller is configured to provide a signal to the single power inverter to selectively and individually (a) turn on or turn off the at least two power branches or (b) adjust a switching frequency of the power inverter.

A third embodiment of the present disclosure relates to an induction heating appliance in the form of a soup well, a dispensing soup well, a liquid dispensing and/or circulating tank, or a dry well. The induction heating appliance includes one or more three-dimensional metal food or liquid containers, a plurality of induction coils, one or more capacitors, at least two power switches, a single power inverter, and a controller. The one or more three-dimensional metal food or liquid containers include one or more surfaces defining a plurality of different heating zones including at least a first heating zone and a second heating zone. The first heating zone and the second heating zone are disposed in different locations on the one or more surfaces. The plurality of induction coils include a first induction coil and a second induction coil. The first induction coil and the second induction coil are each electrically connected in series with the one or more capacitors to form a resonant circuit. The resonant circuit of the first induction coil and the resonant circuit of the second induction coil are each electrically connected in series with one of the at least two power switches to form at least two power branches. The at least two power branches are electrically connected in parallel with the single power inverter. The controller is configured to provide a signal to the single power inverter to selectively and individually (a) turn on or turn off the at least two power branches or (b) adjust a switching frequency of the power inverter.

A fourth embodiment of the present disclosure relates to an induction heating appliance in the form of a plate or pan warmer, a griddle, a double-sided griddle, a panini grill, a plancha, a toaster, a conveyor toaster, or an egg cooker. The induction heating appliances includes one or more three-dimensional metal food or liquid containers, a plurality of induction coils, one or more capacitors, at least two power switches, a single power inverter, and a controller. The one or more three-dimensional metal food or liquid containers include one or more surfaces defining a plurality of different heating zones including at least a first heating zone and a second heating zone. The first heating zone and the second heating zone are disposed in different locations on the one or more surfaces. The plurality of induction coils include a first induction coil and a second induction coil. The first induction coil and the second induction coil are each electrically connected in series with the one or more capacitors to form a resonant circuit. The resonant circuit of the first induction coil and the resonant circuit of the second induction coil are each electrically connected in series with one of the at least two power switches to form at least two power branches. The at least two power branches are electrically connected in parallel with the single power inverter. The controller is configured to provide a signal to the single power inverter to selectively and individually (a) turn on or turn off the at least two power branches or (b) adjust a switching frequency of the power inverter.

A fifth embodiment of the present disclosure relates to an induction heating appliance in the form of a French hot top, an omelet maker, an egg maker, or an induction anywhere device. The induction heating appliance includes one or more three-dimensional metal food or liquid containers, a plurality of induction coils, one or more capacitors, at least two power switches, a single power inverter, and a controller. The one or more three-dimensional metal food or liquid containers include one or more surfaces defining a plurality of different heating zones including at least a first heating zone and a second heating zone. The first heating zone and the second heating zone are disposed in different locations on the one or more surfaces. The plurality of induction coils include a first induction coil and a second induction coil. The first induction coil and the second induction coil are each electrically connected in series with the one or more capacitors to form a resonant circuit. The resonant circuit of the first induction coil and the resonant circuit of the second induction coil are each electrically connected in series with one of the at least two power switches to form at least two power branches. The at least two power branches are electrically connected in parallel with the single power inverter. The controller is configured to provide a signal to the single power inverter to selectively and individually (a) turn on or turn off the at least two power branches, or (b) adjust a switching frequency of the power inverter.

The present disclosure relates to an induction heating system and/or appliance, which uses only one power inverter to control, reduce the total components and complexity of the inverter system, lower the cost, and increase the system reliability. The power of each power branch and coil and the corresponding power suppled to each heating zone is controlled individually, allowing heat to be applied to individual zones of a plate or container and thus maximize the cooking or warming performance and saving on the total energy consumption. The system is flexible in configuration and can be used in multiple applications. Moreover, the system is able to detect the material of vessels to be heated and controls the heating accordingly to avoid non-compatible material heating and reduce the risk of damage to the appliance and, therefore, reduce the risk of harm to the operator thereof.

BRIEF DESCRIPTION OF THE DRAWINGS

In order to clearly describe the implementation method of the present system or technical proposal in current technology, the figures required by the implementation method or current technical description will be introduced simply as follows. Obviously, the figures described below are the implementation methods in the present system. For the common technician in this field, they can obtain other figures in accordance with these figures without any creative effort.

DETAILED DESCRIPTION

Figure 1:
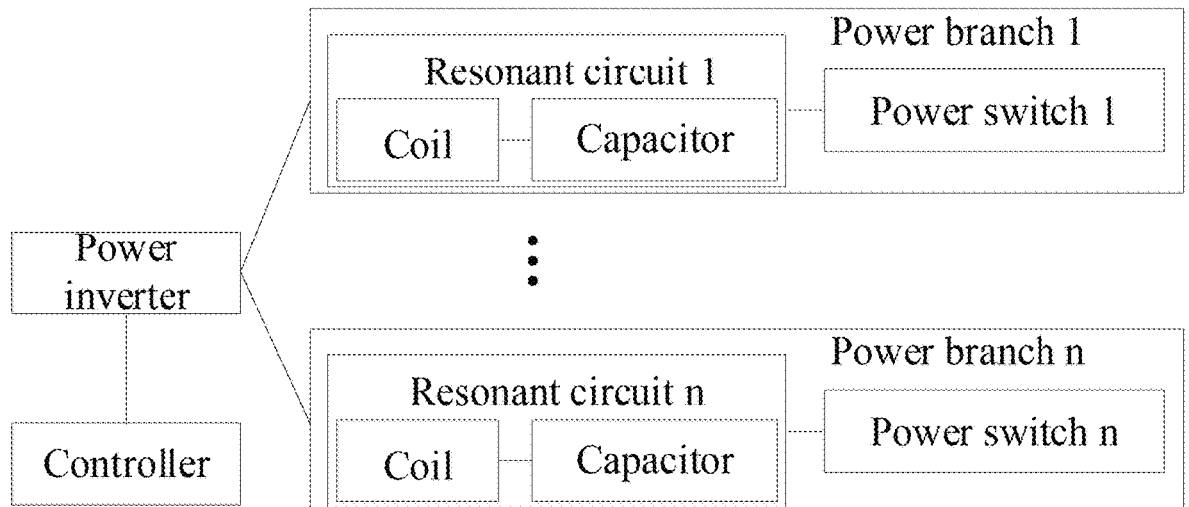
FIG. 1 is a schematic diagram of a first configuration of an induction heating system.

In order to make the purpose, technical proposal, and advantages of the induction heating system of the present disclosure clearer, the following paragraphs will clearly and completely describe the technical proposal in the induction heating system. Obviously, the examples described are a part of possible examples of the induction heating system instead of all possible examples. In general, the description of the figures and the components displayed in the induction heating system examples can be arranged and designed by different configurations.

Therefore, the detailed description to the examples of the induction heating system in the figures does not aim to limit to protect range of the induction heating system, but only indicates the selected examples of the induction heating system. Based on the examples of the induction heating system, all other examples obtained by the common technicians in this field without creative efforts are within the protection range of the present disclosure.

Note that the similar marks and letters in following figures indicate the similar items, and thus there is no need to further define and explain one certain item in following figures if it has been defined in one figure.

In the description of the induction heating system, it may be necessary to illustrate that the position or direction relations indicated by the terms "center", "up", "down", "left", "right", "vertical", "straight", "in" and "out" are the direction of position relations based on the figures, or the relations by which the induction heating system is usually placed when using, and these terms are used only for convenient and simple description of the induction heating system rather than indicating or implying that the induction heating system or components thereof must be placed at certain position, and be constructed and operated in certain direction, therefore, they cannot be deemed as the limitation to the induction heating system. In addition, the terms "first", "second" and "third" are only used for distinguishing rather than for indicating or implying the relative significance.

In addition, the terms "horizontal" and "vertical" does not indicate that the components are required to be placed horizontally or vertically absolutely, but can be slightly tilted. For example, "horizontal" only means that the component direction is more horizontal than "vertical" rather than indicating that it must be completely horizontal, but it can be slightly tilted.

In the description of the induction heating system, it may also be necessary to indicate that the terms "setting", "installation", "connection" and "connecting" should be understood in board sense, for example, the connection can refer to the permanent connection, or removable connection, or integrated connection, or mechanical connection, or electrical connection, or direct connection or indirection connection through medium, or the inside connection of two parts. Regarding the common technicians in this field, they can understand the specific meaning of the terms above mentioned in the present disclosure in accordance with specific situations.

Some examples of the induction heating system are illustrated in combination with the figures. The examples and features in the examples described below can combine with each other in case of no conflict.

Current induction heating systems suffer from several deficiencies. First, with a single coil, induction warmers or cookers can only heat at a dedicated position. Such devices are not able to provide controllable heat at multiple locations of the same vessel or multiple vessels at the same time. Second, current induction heating systems use duty cycle control to send power to separate coils or require separate inverters to heat separate coils. Such a control structure significantly complicates the system circuitry and increases the cost on the maintenance of the system. Moreover, current induction heating systems heat unnecessary areas during operation and they have limitations in detecting the material of the vessels such that non-compatible materials can be heated, which can cause damage to the circuitry and potentially harm the appliances or the operators thereof.

Base on above concerns, the induction heating system of the present disclosure provides an improved solution that can heat multiple locations of a single vessel and/or heating multiple different vessels at the same time. Furthermore, the induction heating system of the present disclosure advantageously has a simple circuit structure and low energy consumption and is able to detect the vessel material to avoid heating non-compatible materials and protect the appliance from damage and harming the operators thereof.

A first induction heating system of the present disclosure is described in detail below.

In FIG. 1, the first induction heating system includes a plurality of induction coils, one or more resonant capacitors, at least two power switches, one power inverter, and a controller.

The induction coils may have various different wire gauge, length, material and wiring method, etc. Different coils connect in series with different resonant capacitors to form different resonant circuit to deliver energy. Each resonant circuit connects in series with a power switch to form a power branch to output different power. At least two power branches are connected in parallel to the single power inverter. The controller is configured to provide a signal to the single power inverter to selectively and individually (a) turn on or turn off the at least two power branches and/or (b) adjust a switching frequency of the power inverter.

For example, in FIG. 1, the system includes one power inverter, connected with one controller and n power branches, where n can be any integer that is greater or equal to 1. All n power branches are formed with n resonant circuits and n power switches connected in series correspondingly. The controller is configured to provide a signal to the single power inverter to selectively and individually (a) turn on or turn off the n power branches and/or (b) adjust a switching frequency of the power inverter.

To simplify description, the induction coils are described as a first coil and a second coil. The first coil and the second coil are connected separately with two different resonant capacitors in series to form two different resonant circuits. Each resonant circuit connects in series with a power switch to form two different power branches. The two different power branches are connected in parallel to the single power inverter. The controller is configured to provide a signal to the single power inverter to selectively and individually (a) turn on or turn off the two power branches and/or (b) adjust a switching frequency of the power inverter.

To further minimize the power loss of the power switch in the power branch, the selection of the power switch can be an Insulated Gate Bipolar Transistor ("IGBT") or a Metal-Oxide-Semiconductor Field-Effect Transistor ("MOSFET").

In the first induction system of FIG. 1, there are two ways to regulate the output power of the resonant circuit:

(1) The controller sends a signal to vary the switching frequency of the single power inverter to adjust the output power of all of the resonant circuits.

(2) The controller sends a signal to turn-on and turn-off the power switch in each power branch individually to adjust the output power of each branch.

Based on this, the connection of the power switch and the resonant circuit can be at least one of:

(1) One power switch connects with one resonant circuit so that the one power switch can individually control one resonant circuit output by varying the turn-on time or (2) one power switch connects with a plurality of resonant circuits to control the output power of all resonant circuits at the same time by varying the turn-on time.

The first induction heating system uses only one power inverter, which reduces the total components and complexity of the inverter system, lowers the cost, and increases the system reliability. The power of each power branch and coil and the corresponding power suppled to each heating zone associated therewith is controlled individually, allowing heat to be applied to individual zones of a surface (e.g., a plate, container, etc.) and, therefore, maximize the cooking or warming performance and reduce the total energy consumption. The first induction heating system is flexible in configuration such that it can be used in multiple applications.

To further improve the adaptivity of the first induction heating system, the power inverter can be or have either a half-bridge topology or a full-bridge topology.

To regulate the output power of the different coils, each power branch is able to regulate the output power according to the resonant properties of the resonant circuit.

To achieve individual control of the temperature at different coils, the follow method can be applied: the controller controls the turn-on time of the power switch, thus regulating the output power of the corresponding power branch and maintaining the desired or set temperature.

To further assure the heating stability of the coils, the inductance of the coils can be optimized from 25 microhenries ("µH") to 250 µH.

In the first induction heating system, each power branch involves the resonant circuit formed by the coil and resonant capacitor. Thus, the resonant circuits in different power branches can have specific resonant properties, where the variation in the resonant properties can be indicated by one or more parameters (such as resonant frequency, characteristic impedance, quality factor, etc.)

The resonant frequency is defined by the inductance of the coil and the capacitance of the capacitor, as shown in the below equation:

$$f_r = \frac{1}{2\pi\sqrt{LC}}$$

where $f_r$ is the resonant frequency, L is the inductance of the coil, and C is the capacitance of the resonant capacitor.

The quality factor is defined as:

$$Q = \frac{\sqrt{L/C}}{R}$$

where Q is the quality factor and R is the equivalent resistance with heating material coupling.

The maximum output power of each branch is determined by the inverter switching frequency. As the switching frequency is getting closer to the resonant frequency of the resonant circuit, the higher the power will be in the branch, while if the switching frequency is further from the resonant frequency, the lower the power will be in the branch.

To satisfy the requirements in different applications, the resonant circuit with the first coil and the resonant circuit with the second coil can have resonant properties within certain range of discrepancy or variation, or can have completely different resonant properties.

The resonant circuit with the first coil and the resonant circuit with the second coil can have resonant properties within certain range of discrepancy, as an optimized implementation, the resonant properties are controlled within 10% from each other. In this case, when the power inverter is working with a specific switching frequency, it is reasonable to assume the maximum power of all the power branches is substantially identical.

The resonant circuit with the first coil and the resonant circuit with the second coil can have completely different resonant properties, as an optimized implementation, the resonant properties are controlled to be greater than 10% from each other. In this case, when the power inverter is working with a specific switching frequency, the maximum power of the power branch with the first coil is different from the power branch with the second coil.

To achieve better temperature control, the first induction heating system further includes one or more temperature sensors. The temperature sensor(s) can measure the temperature at specific locations and provide the temperature information to the controller. The controller adjusts control signal to the power inverter according to the temperature signal(s) to regulate the power of different power branches.

Based on this, a temperature setpoint may be set before heating starts. The controller regulates the output power of the power inverter based on the temperature sensor feedback and preset temperature setpoint(s) to maintain the temperature at each location.

To further expand the adaptivity of the first induction heating system in different applications, the configuration of the resonant circuit can be adjusted to include at least one of:

(1) one resonant circuit formed by one coil and one capacitor;

(2) one resonant circuit formed by one coil and a plurality of capacitors;

(3) one resonant circuit formed by a plurality of coils and one capacitor connected in series;

(4) one resonant circuit formed by a plurality of coils and one capacitors connected in parallel;

(5) one resonant circuit formed by a plurality of coils and a plurality of capacitors connected in series; or (6) one resonant circuit formed by a plurality of coil and a plurality of capacitors connected in parallel.

Different resonant circuits can have the same or different configuration.

Figure 2:
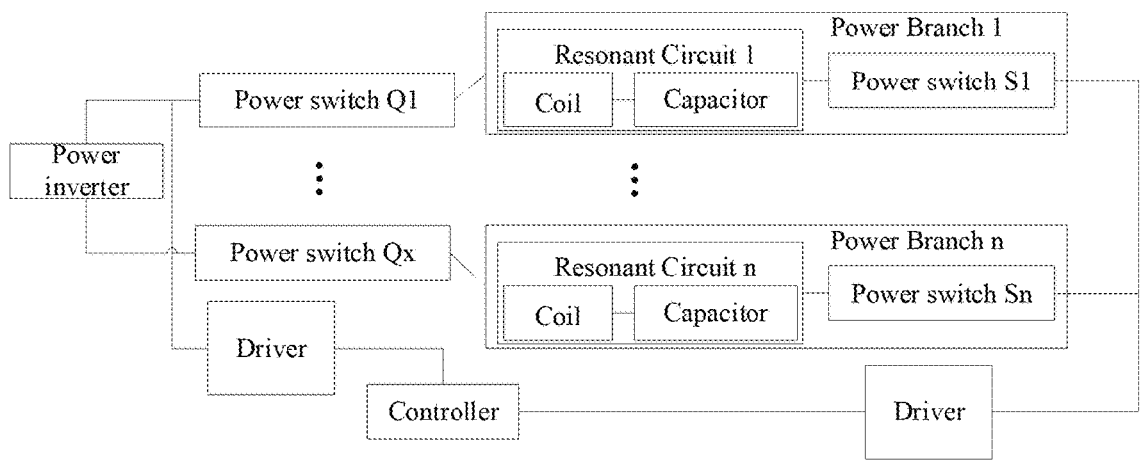
FIG. 2 is a schematic of a second configuration of an induction heating system.

As shown in FIG. 2, a second induction heating system, expanding on the first induction heating system, includes at least one first driver connected with the power switch in each power branch. The first driver receives the signal from the controller to regulate the turn-on time of the power switch to regulate the output power of each of the power branches.

To operate properly, the type of the first driver is selected according to the type of the power switch. For example, if the power switch is an IGBT, the first driver is an IGBT driver; if the power switch is a MOSFET, the first driver is a MOSFET driver.

To regulate the switching frequency of the power inverter, the power inverter includes a power switch, which can be the same or different types of the power switch in the power branch (IGBT or MOSFET) to minimize the power loss.

Therefore, to further improve the system automation, the system includes a second driver that is connected with the power switch in the power inverter, which is configured to receive the control signal from the controller and vary the switching frequency of the power inverter. Similar to the first driver of the power switch in the power branch, the second driver of the power switch in the power inverter may match the type of power switch.

For example, in FIG. 2, the second induction heating system includes one power inverter with x power switches, each power switch connects to at least one of n power branches. All of the x power switches are connected together with the second driver, where x and n both are an integer greater than or equals to 1. All n power branches are formed by n resonant circuits and n power switches connected in series, where all n power switches are connected together with the first driver. The system also includes a controller that connects with the first driver and the second driver where the controller sends signals to both the first driver and the second driver to regulate the output power at each power branch.

To realize the detection of the material of the vessels, the controller can determine the material based on the phase angle between the control signal of coil current together with the peak coil current, control the heating of the vessels of different materials, avoid the heating of non-compatible materials, and protect safety of the system and operator thereof.

To identify the material near the coil, the coil current is measured. The first or second induction heating systems may further include a plurality of current sensors that connect to each of the coils correspondingly to detect its current. The current sensors can be selected from all common current sensors and there is no limitation.

The first or second induction heating systems may further include signal conditioning circuitry, which is used to transfer/convert analog signals of the coil current into digital signals. Such signal conditioning circuitry may be formed from some common electronic circuits (such as A/D converter, etc.) and there is no limitation in selection.

The first or second induction heating system may also include peak coil current detection circuitry, which detects the digital signals from the signal conditioning circuitry and sends alarms to the controller if the peak coil current exceeds a maximum threshold. The controller receives the alarms and may engage interlocks of the system. For example, when heating non-ferrous material such as aluminum or copper, the peak coil current will exceed the threshold so that the peak current detection circuitry sends an alarm to the controller. Upon receiving the alarm, the controller sends protection signals to shut-down and interlock the system.

Figure 3:
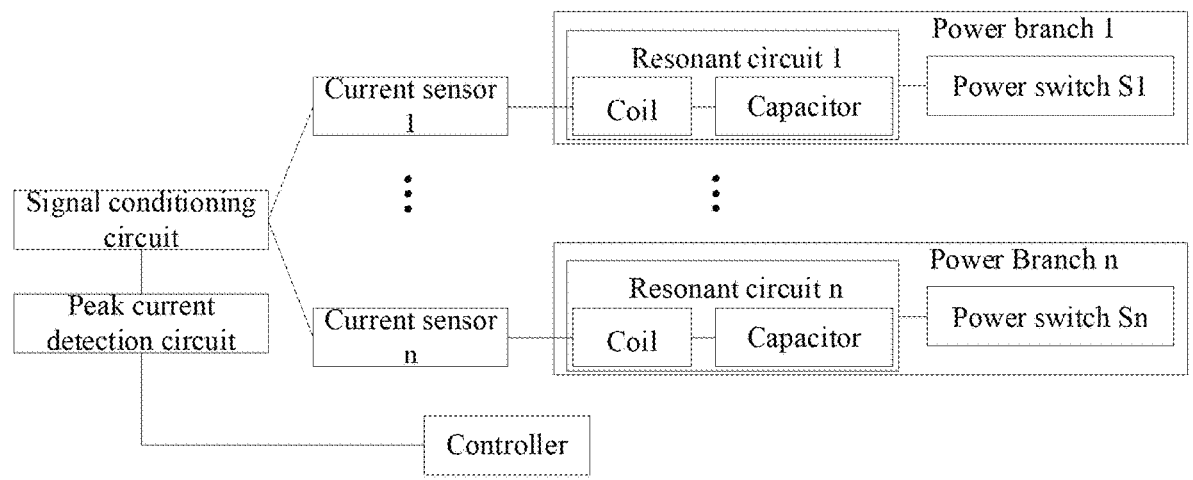
FIG. 3 is a partial schematic of the first configuration of the induction heating system.

In FIG. 3, n current sensors connect with n coils in the power branches correspondingly. All signals from the n current sensors are fed to the signal conditioning circuitry. The peak current detection circuitry is in connection with the signal conditioning circuitry and the controller. n can be any integer greater than or equal to 1. The signal conditioning circuitry transfers/converts all the current signals from the current sensors into digital signals, while the peak current detection circuitry checks the signals and sends the results to the controller. Moreover, the peak current detection circuitry also sends alarms if the coil current is higher than the maximum threshold in order to trigger the system shutdown and interlock by the controller.

To further improve the efficiency of the material detection and to speed up the heating process, two methods may be used, which are detailed below.

Figure 4:
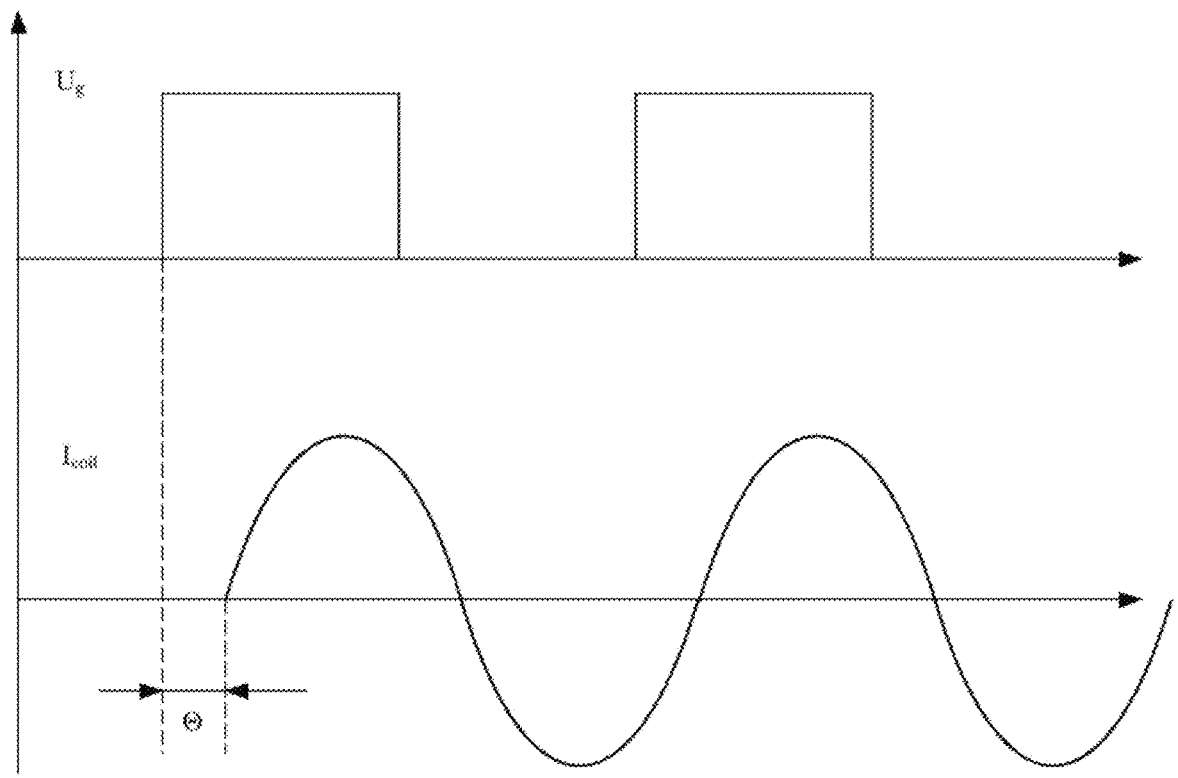
FIG. 4 is a graph displaying a pan detection method showing a phase angle between a driving signal and a zero crossing of a coil current.

In the first method, the material detection algorithm is implemented in the controller. There is a phase angle between the rising edge of the signal from the second driver of the power inverter power switch and the zero-crossing point of the coil current, as shown in FIG. 4. A pulse is generated for the controller to determine whether the material is compatible or not. In FIG. 4, $I_{coil}$ represents the coil current, $U_g$ is the signal from the second driver of the power inverter power switch, $\Theta$ is the phase angle between rising edge of $U_g$ and zero-crossing point of $I_{coil}$.

Figure 5:
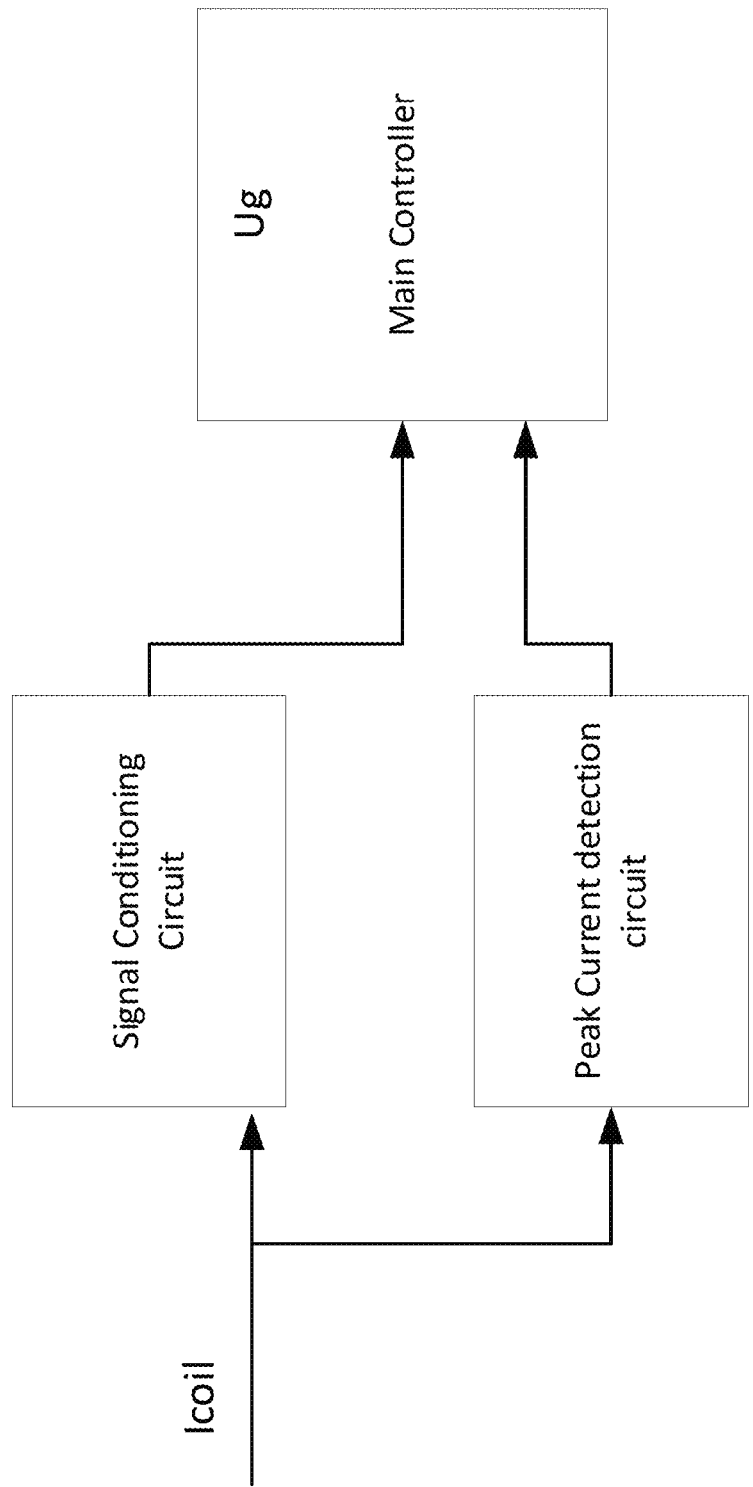
FIG. 5 is a schematic flow diagram of a first material detection method.

In FIG. 5, $I_{coil}$ represents the coil current (usually an analog signal) and $U_g$ is the signal from the second driver of the power inverter power switch. $I_{coil}$ is transferred/converted to a digital signal by the signal conditioning circuitry; the phase angle between $U_g$ and $I_{coil}$ generates a pulse and feedbacks to the controller, while the peak current detection circuitry also sends the detection results to the controller. The controller determines if the material is compatible based on the fact that both $\Theta$ and peak current are within a preset range.

Figure 6:
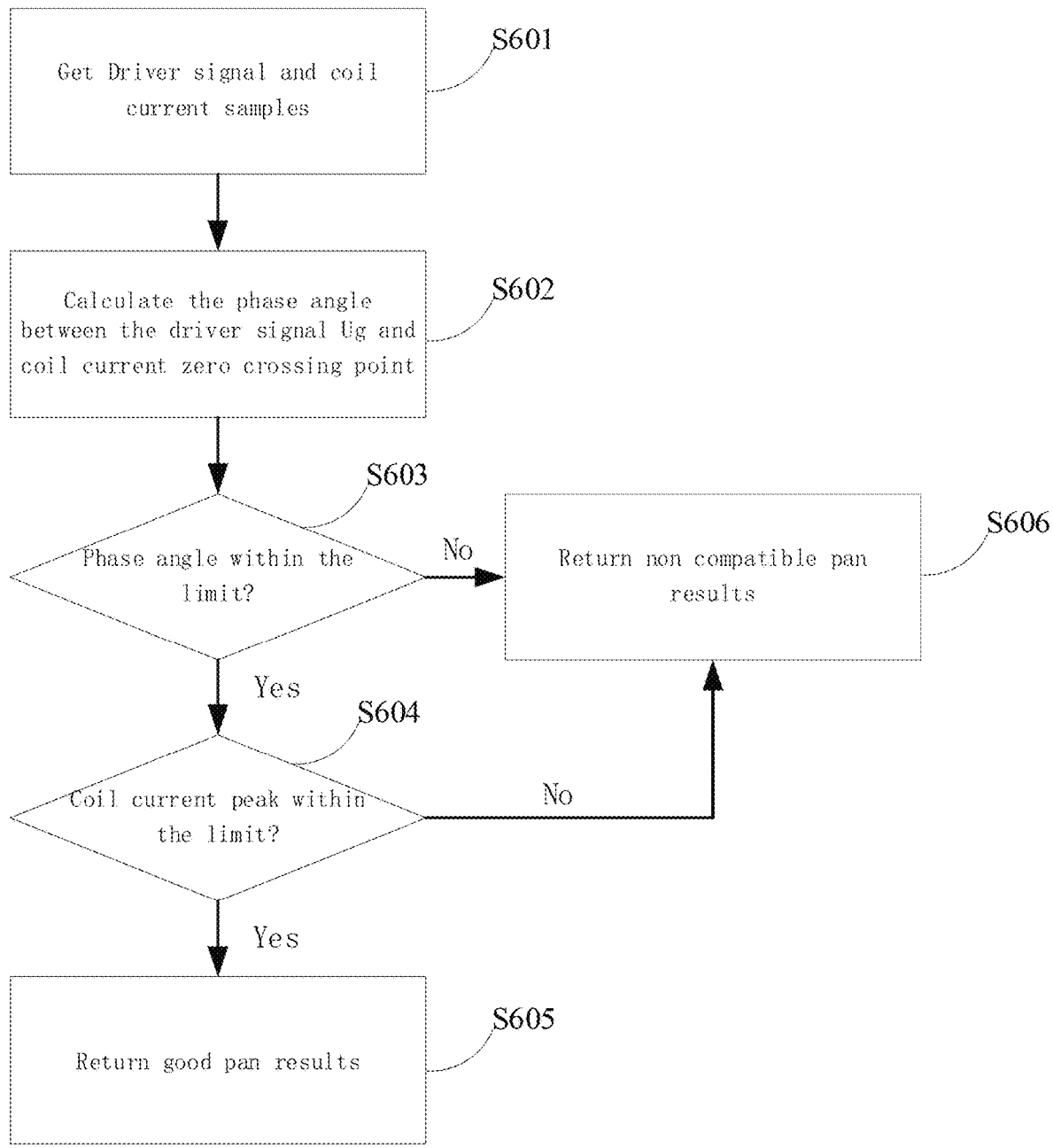
FIG. 6 is a flowchart of the first material detection method.

As shown in FIG. 6, the controller executes following steps when using the first method:

Step S601, acquiring $U_g$ and $I_{coil}$.

Step S602, calculating phase angle between $U_g$ and $I_{coil}$.

Step S603, if the phase angle is within the preset range or limit, go to S604, otherwise, go to S606.

Step S604, if the peak coil current is within the preset range, go to S605, otherwise, go to S606.

Step S605, determining the heating material is compatible.

Step S606, determining the heating material is non-compatible.

In the second method, the material detection algorithm is implemented in the material detection circuitry. The system comprises the controller, the signal conditioning circuitry, the peak current detection circuit, and material detection circuitry (including pulse width detector).

Figure 7:
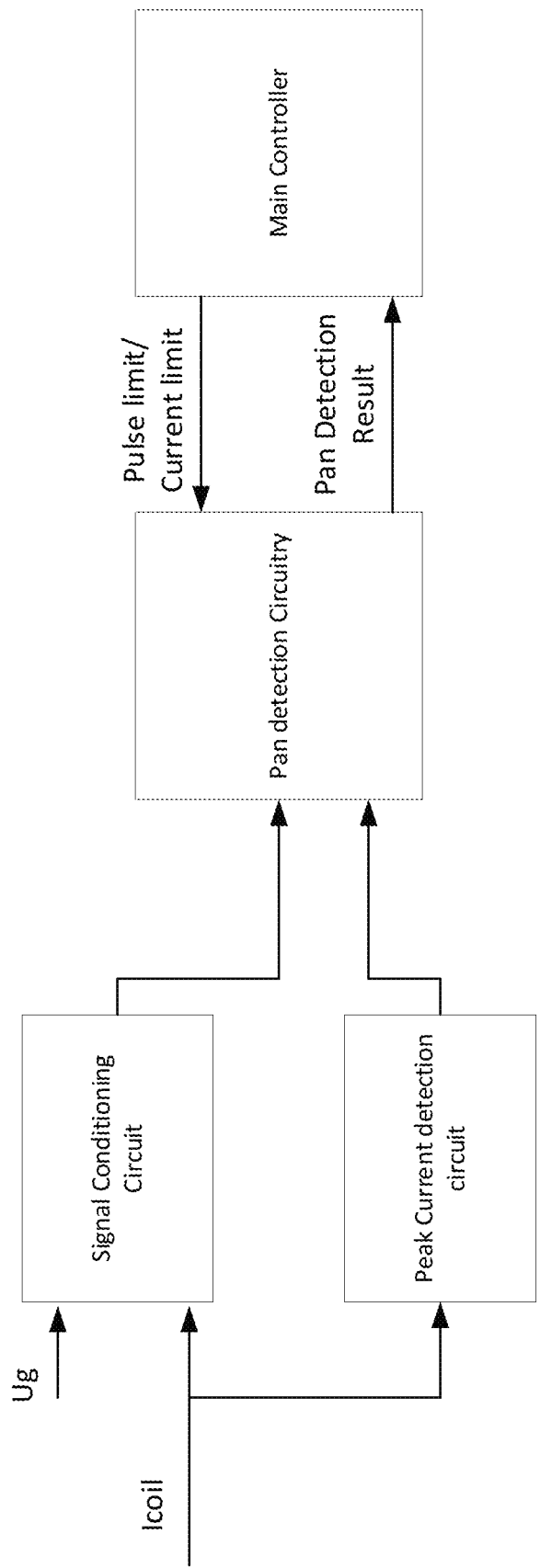
FIG. 7 is a schematic flow diagram of a second material detection method.

In FIG. 7, $I_{coil}$ represents the coil current (usually an analog signal), $U_g$ is the signal from the second driver of the power inverter power switch. $I_{coil}$ is transferred/converted to a digital signal by the signal conditioning circuitry; the phase angle between $U_g$ and $I_{coil}$ generates a pulse, while peak current detection circuitry also sends the detection results to the material detection circuitry. The material detection circuitry determines if the material is compatible based on the fact that both Θ and peak current are within the preset range and sends the result to the controller.

Figure 8:
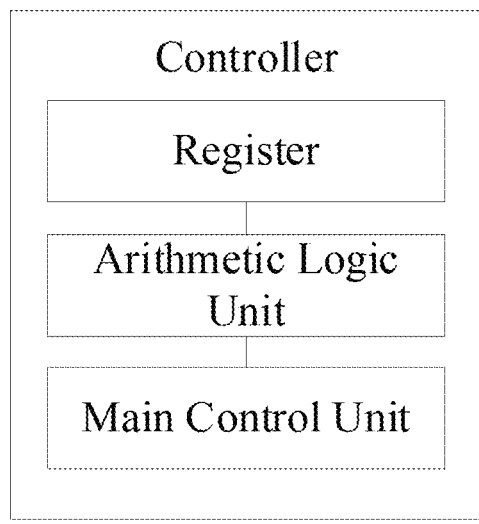
FIG. 8 is a schematic block diagram of a controller.
Figure 9:
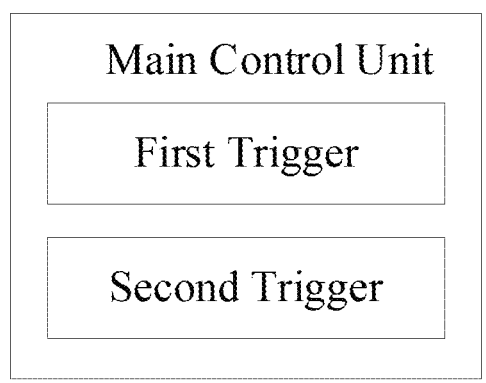
FIG. 9 is a schematic block diagram of a main control unit of the controller.

As shown in FIG. 8, in the second detection method, the controller includes a register, an Arithmetic Logic Unit ("ALU"), and a Main Controller Unit ("MCU"). The register is connected with the material detection circuitry, stores pulse width thresholds, peak current thresholds, and the correlation between the pulse width and material, sends all of the thresholds to the material detection circuitry, and receives the detection results from material detection circuitry. The ALU connects with the register and executes a logic operation for the detection results where the ALU contains the first value of compatible material and the second value of non-compatible material and the values are different. The MCU connects with both ALU and the second driver of the power inverter power switch and the first driver of the power branch power switch, and controls the turn-on and turn-off of the power switches. In FIG. 9, the MCU includes a first trigger that sends the turn-on signal to the power switches if the ALU outputs the first value and the turn-off signal if the ALU outputs the second value.

By the two material detection methods, the controller can easily identify if the material of the vessel is compatible or not, so as to control the output power of the coil in the resonant circuit, preventing heating the non-compatible materials and protecting the appliance and the operator thereof.

Figure 10:
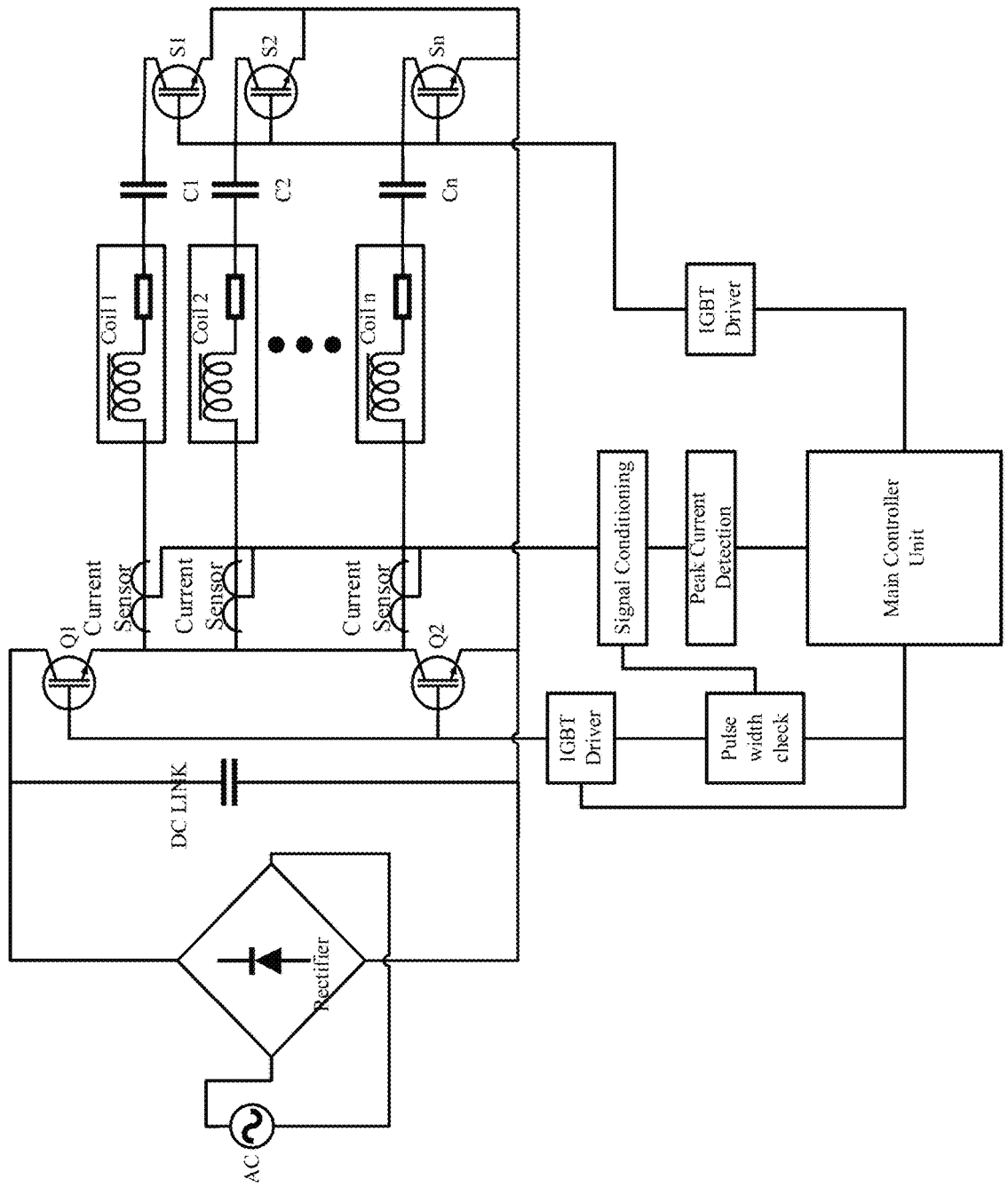
FIG. 10 is a schematic diagram of a first circuit topology of the induction heating system.

FIG. 10 describes one of the circuit topologies used in the second method. In FIG. 10, the power inverter has a half-bridge topology, Coil 1 to Coil n represent n different coils, C1 to Cn are the resonant capacitors correspondingly, S1 to Sn are n power switches (IGBTs) used in power branches 1 to n. n coils and n resonant capacitors are connected in series correspondingly to form n resonant tank circuits, and each resonant tank circuit connects in series with a corresponding power switch to form n power branches. Power switches S1 to Sn are connected with first driver respectively. Q1 and Q2 represent the power switches (IGBTs) of the power inverter, which are connected with the second driver. All the n power branches are connected in parallel with the half-bridge topology formed by Q1 and Q2, where n can be any integer that is greater than or equals to 1. One controller connects individually with each driver (the first driver for S1 to Sn and the second driver for Q1 and Q2). Current sensor 1 to current sensor n are n current sensors that are connected with the coils respectively. The signals from the current sensors are fed into the signal conditioning circuitry which is connected to the peak current detection circuitry and then connected to the controller. A pulse width detector is connected with the second driver of Q1 and Q2, the signal conditioning circuitry, and the controller. In the circuitry described in FIG. 10, n current sensors measure the current of each coil; the signal conditioning circuitry transfers/converts the analog signals into digital signals and sends to the pulse width detector; the pulse width detector receives the current signals, generates pulse with the driver voltage signals; the controller sends predefined correlation of pulse width and material together with the peak current to the pulse width detector so that the pulse width detector can determine if the material is compatible or not; then, the controller sends control signals to the second driver of Q1 and Q2 to regulate the switching frequency, and/or to the first driver of S1 to Sn to control the turn-on time of the power branches, based on the material detection result.

Figure 11:
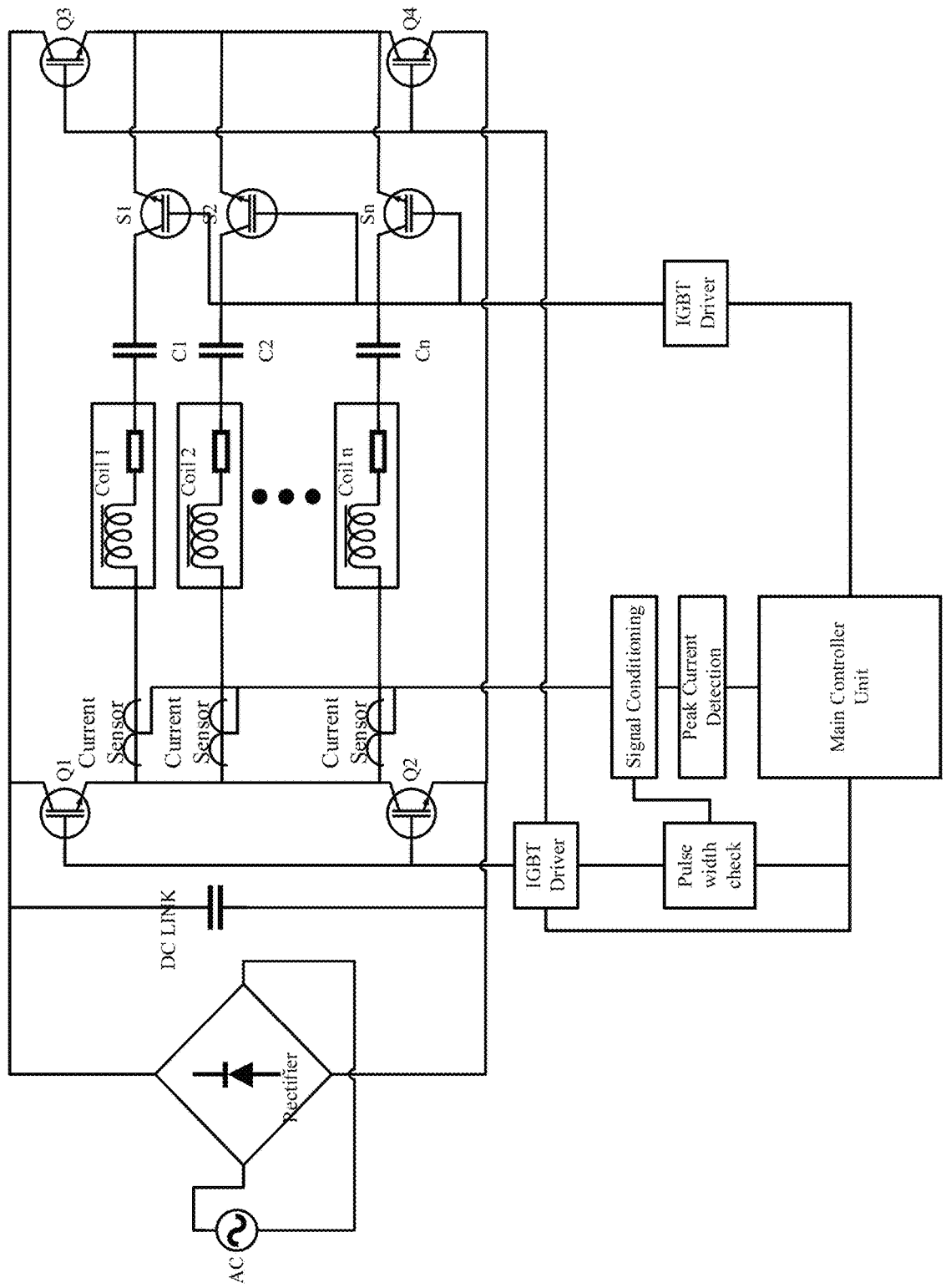
FIG. 11 is a schematic diagram of a second circuit topology of the induction heating system.

FIG. 11 describes another one of the circuit topologies used in the second method. In FIG. 11, the power inverter adopts full-bridge topology, Coil 1 to Coil n represents n different coils, C1 to Cn are the resonant capacitor correspondingly, S1 to Sn are n power switches (IGBT) used in power branches 1 to n. n coils and n resonant capacitors are connected in series correspondingly to form n resonant tank circuits, and each resonant tank circuit connects in series with corresponding power switch to form n power branches. Power switches S1 to Sn are connected with first driver respectively. Q1 to Q4 represent the power switches (IGBT) of the power inverter, which are connected with second driver. All the n power branches are connected in parallel with the full-bridge topology formed by Q1 to Q4, where n can be any integer that is greater than or equals to 1. One controller connects individually with each driver (the first driver for S1 to Sn and the second driver for Q1 to Q4). Current sensor 1 to current sensor n are n current sensors that are connected with the coils respectively. The signals from the current sensors are fed into the signal conditioning circuitry, which is connected to the peak current detection circuitry and then connected to the controller. A pulse width detector is connected with the second driver of Q1 to Q4, the signal conditioning circuitry, and the controller. In the circuitry described in FIG. 11, n current sensors measure the current of each coil; signal conditioning circuitry transfers the analog signals into digital signals and sends to the pulse width detector; pulse width detector receives the current signals, generates pulse with the driver voltage signals; the controller sends predefined correlation of pulse width and material together with the peak current to the pulse width detector so that the pulse width detector can determine if the material is compatible or not; then, the controller sends control signals to second driver of Q1 to Q4 to regulate the switching frequency, and/or to the first driver of S1 to Sn to control the turn-on time of the power branches, based on the material detection result.

To simplify the operation, the output signal from the controller can include an input command from a user interference. Based on this, the induction heating system includes a human machine interference ("HMI"), which is connected to the controller. The HMI may include a user interference panel, which delivers the input command from the HMI to the controller so as to control the induction heating system accordingly. This design enables direct control from the user through the user interference panel and improves the automation of the induction heating system.

To further improve the efficiency of the control for the power inverter, it can be controlled by one user interference panel, or it can be also controlled by a plurality of user interference panels, where all the panels and the power inverter are connected in a serial communication network to share information.

The user interference panels are connected with the power inverter and deliver input commands to the power inverter to change the inverter parameters, which improves the flexibility of setting the parameters. Moreover, the power inverter can send back its setting parameters to the user interference panel including load power factor, efficiency, etc.

Figure 12:
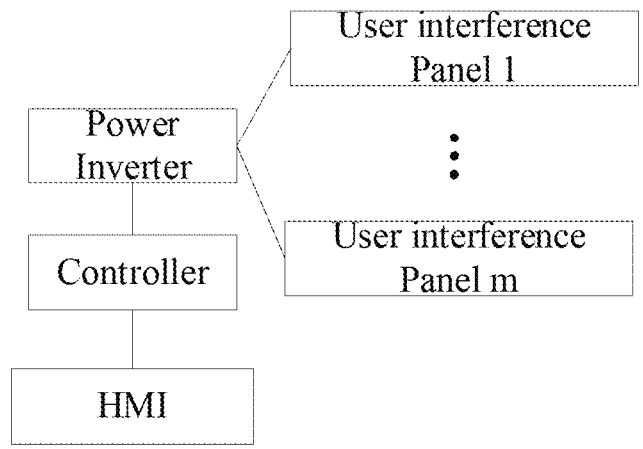
FIG. 12 is a schematic block diagram of a user interference of the induction heating system.

As shown in FIG. 12, m user interference panels are connected to one power inverter and the controller is connected with the HMI, where m can be any integer greater than or equal to 1. The HMI includes the user interference panels. Different user interference panels send different signals to the power inverter to change the inverter parameter settings. The HMI can deliver the input command to the controller through the panel(s) so that the control can control the induction heating system accordingly.

In the second induction heating system, the system only includes one power inverter. Such a design reduces the component counts for the power inverter and relevant parts, lowers the system complexity and cost while maintaining the system reliability. Furthermore, with the individual control with the coils at different locations, the induction heating system is flexible with combinations of different applications and vessels, so as to adjust the heating methods, reducing the system energy consumption and increasing the adaptivity of the system. With the material detection methods, the controller is able to detect if the material is compatible or not, preventing vessels with non-compatible material to protect appliance and human safety. With the HMI and user interference panels, the induction heating system acquires a high level of automation and a lower operation cost.

The two induction heating systems outlined above may be used in a variety appliance applications where the appliance includes at least one of a griddle or a three-dimensional container, a plurality of induction coils, one or more capacitors, at least two power switches, a single power inverter, and a controller.

The at least one of the griddle or the three-dimensional container has a heating surface including different heating zones where different coils are used to heat the different heating zones. The griddle or the three-dimensional container not only can be common shapes such as a plate, a cylinder, etc., but can also be any special structure that creates a cavity, which can be decided according to the appliance. The induction coils can be any electro-magnetic generating coils with different diameters, lengths, materials, winding methods, etc. Different coils connect in series with different capacitors to form different resonant circuits to generate heating energy. Different resonant circuits connect in series with different power switches to form different power branches to deliver power. At least two power branches are connected in parallel to one power inverter. The controller is used to send control signals to the power inverter and control the switching frequency of the inverter as well as the turn-on time of different power branches.

To further simplify the description, the above heating zones are categorized as a first heating zone and a second heating zone and the coils are separated as a first coil and a second coil. The first coil is used to heat the first heating zone and the second coil is used to heat the second heating zone. The first coil and the second coil form different resonant circuit with connection in series with different capacitors. Different resonant circuits connect in series with different power switches to form different power branches. All power branches are connected in parallel to one power inverter. The controller is used to send control signals to the power inverter and control the switching frequency of the power inverter as well as the turn-on time of different power branches.

In this appliance application, the induction heating system only contains one power inverter, thereby reducing the component counts for the power inverter and relevant part, lowers the system complexity and cost while maintaining system reliability. Furthermore, with the individual control with the coils at different locations, the system is flexible with combinations of different applications and vessels, so as to adjust the heating methods, reducing the system energy consumption, and increasing the adaptivity of the system.

Moreover, the heating surface is preferred to be flat for better heating.

For ease of control, the control signal comprises temperature setpoints for the first heating zone and the second heating zone. Upon receiving the control signals, the power inverter can at least deliver the power to the first coil or the second coil so as to maintain the temperatures at the setpoints.

The appliance may further include a glass plate disposed along the heating surface to provide insulation and improve safety. The glass plate is preferred to be disposed between the heating surface and the plurality of induction coils (the first coil and the second coil) to ensure the insulation.

The controller is configured to vary the signal based on a predetermined power control algorithm. The predetermined power control algorithm is configured to achieve a desired temperature at the first heating zone or the second heating zone.

The appliance may include a temperature sensor coupled to the controller. The temperature sensor is one of (a) disposed in the first heating zone or the second heating zone, (b) configured to directly or indirectly monitor the temperature of a food product associated with the three-dimensional container, or (c) in direct or indirect contact with the heating surface and thereby positioned to directly or indirectly monitor the temperature of the heating surface.

Therefore, at least one temperature sensor may be located in the first heating zone and/or the second heating zone in at least one of the following several arrangements:

(1) the temperature sensor directly contacts with a food product to directly measure the temperature of the food product with the temperature sensor;

(2) the temperature sensor directly contacts with the three-dimensional container to directly measure the temperature of the three-dimensional container with the temperature sensor, and then indirectly determine the temperature of the food product;

(3) the temperature sensor directly contacts with a heating surface (as close to the position of the first coil or the second coil) to directly measure the temperature of the heating surface with the temperature sensor; and/or (4) the temperature sensor is positioned close to but do not directly in contact with the heating surface (such as a position close to the first coil or the second coil), and the temperature measured by the temperature sensor is used to indirectly determine the temperature of the heating surface.

The allocation of the temperature sensors can be adjusted according to the control requirements to realize different functions.

The temperature sensor is in at least one of direct or indirect contact with the heating surface and the temperature sensor is configured to provide signals relating to a detected temperature to the controller. The controller is configured to vary the signal provided to the single power inverter based on the signals received from the temperature sensor.

The controller is configured to vary the signal provided to the single power inverter based on a desired temperature at the first heating zone or the second heating zone. The temperature sensor is in direct or indirect contact with the heating surface and thereby positioned to directly or indirectly monitor the temperature of the surface. The temperature sensor is disposed proximate the first induction coil or the second induction coil.

The appliance may further include a dispenser mechanism configured to dispense the food product according to different needs. The dispenser may include valves such as manual valves or electro-magnetic valves, or combinations of tubes and valves according to the application.

For the food that needs to be held warm for a while before dispensing, the holding temperature is usually lower than the cooking temperature and the food needs to be heated before dispensing. To optimize the heating zones, the first heating zone may be closer to the dispenser than the second heating zone. The controller may be configured to engage the power inverter such that the first induction coil maintains a temperature at the first heating zone that is greater than the temperature maintained by the second induction coil at the second heating zone. The temperatures of both heating zones can be set according to the actual needs.

To improve the user experience, a position sensor may be coupled to the controller and configured to provide signals to the controller. The controller may be configured to determine the presence or absence of a food vessel within the first heating zone or the second heating zone based on the signals from the position sensor. This method can help the operator be aware of the position of the heating vessels and making sure the heating vessels are placed at the correct position for quality heating.

In other embodiments of the appliance application, the appliance includes at least one of a soup well, a dispensing soup well, a liquid dispensing well, a circulating tank, or a dry well. Such an appliance may include one or more three-dimensional metal food or liquid containers, a plurality of induction coils, one or more capacitors, at least two power switches, a single power inverter, and a controller.

The heating surface of the three-dimensional container includes different heating zones where different coils are used to heat the different heating zones. The three-dimensional container not only can be common shapes such as cylinder, conical, etc., but it can also be any special structure that creates a cavity, which can be decided according to the appliance. The induction coils can be any electro-magnetic generating coils with different diameters, lengths, materials, winding methods, etc. Different coils connect in series with different capacitors to form different resonant circuits to generate heating energy. Different resonant circuits connect in series with different power switches to form different power branches to deliver power. At least two power branches are connected in parallel to one power inverter. The controller is used to send control signals to the power inverter and control the switching frequency of the power inverter as well as the turn-on time of different power branches.

To further simplify the description, the above heating zones are categorized as a first heating zone and a second heating zone and the coils are separated as a first coil and a second coil. The first coil is used to heat the first heating zone and the second coil is used to heat the second heating zone. The first coil and the second coil form different resonant circuit with connection in series of different capacitors. Different resonant circuits connect in series with different power switches to form different power branches. All of the power branches are connected in parallel to one power inverter. The controller is used to send control signals to the power inverter and control the switching frequency of the power inverter as well as the turn-on time of different power branches.

In this appliance application, the induction heating system only contains one power inverter, thereby reducing the component counts for the power inverter and relevant parts, lowering the system complexity and cost while maintaining system reliability. Furthermore, with the individual control with the coils at different locations, the system is flexible with combinations of different applications and shapes of three-dimensional containers, so as to adjust the heating methods, reducing the system energy consumption, and increasing the adaptivity of the system.

Moreover, the heating surface is preferred to be flat for better heating.

For ease of control, the control signal comprises temperature setpoints for the first heating zone and the second heating zone. Upon receiving the control signals, the power inverter can at least deliver the power to the first coil or the second coil so as to maintain the temperatures at the setpoints.

The appliance may further include a glass plate disposed along the heating surface to provide insulation and improve safety. The glass plate is preferred to be disposed between the heating surface and the plurality of induction coils (the first coil and the second coil) to ensure the insulation.

The controller is configured to vary the signal based on a predetermined power control algorithm. The predetermined power control algorithm is configured to achieve a desired temperature at the first heating zone or the second heating zone.

The appliance may include a temperature sensor coupled to the controller. The temperature sensor may be (a) disposed in the first heating zone or the second heating zone, (b) configured to directly or indirectly monitor the temperature of a food product associated with the three-dimensional container, or (c) in direct or indirect contact with the heating surface and thereby positioned to directly or indirectly monitor the temperature of the surface. Therefore, the temperature sensor may (1) directly measure the temperature of the food, (2) indirectly measure the temperature of the food through the three-dimensional metal container, (3) directly measure the temperature of the heating surface by directly contacting the heating surface, and/or (4) indirectly measure the temperature of the heating surface. In order to enable different temperature sensors to realize different functions, the arrangement of temperature sensors is similar to the corresponding content above, which will not be repeated here. The allocation of the temperature sensors can be adjusted according to the control requirements to realize different functions.

The temperature sensor may be in at least one of direct or indirect contact with the heating surface and the temperature sensor may be configured to provide signals relating to a detected temperature to the controller. The controller may be configured to vary the signal provided to the single power inverter based on the signals received from the temperature sensor.

The controller may be configured to vary the signal provided to the single power inverter based on a desired temperature at the first heating zone or the second heating zone. The temperature sensor may be in direct or indirect contact with the heating surface and thereby positioned to directly or indirectly monitor the temperature of the surface.

The temperature sensor may be disposed proximate the first induction coil or the second induction coil.

The appliance may include a dispenser. The first heating zone may be closer to the dispenser than the second heating zone. The controller may be configured to engage the power inverter such that the first induction coil maintains a temperature at the first heating zone that is greater than the temperature maintained by the second induction coil at the second heating zone.

To improve the user experience, a position sensor may be coupled to the controller and configured to provide signals to the controller. The controller is configured to determine the presence or absence of a food vessel within the first heating zone or the second heating zone based on the signals from the position sensor. This method can help the operator aware the position of the heating vessels and making sure they are placed at the correct position for quality heating.

The appliance may include a cabinet or well configured to hold the one or more three-dimensional metal food containers, which may also include a stirring mechanism and/or thermistors to detect the temperature of the food product and provide feedback to the controller to provide the desired amount of heat to the food container to maintain the proper mixture and temperature of the food.

The appliance may include a cylindrical or tubular metal container with one or more chambers held at the same or different temperatures allowing the dispensed food or liquid to be dispensed or circulated at a different temperature than the primary holding container.

Figure 13:
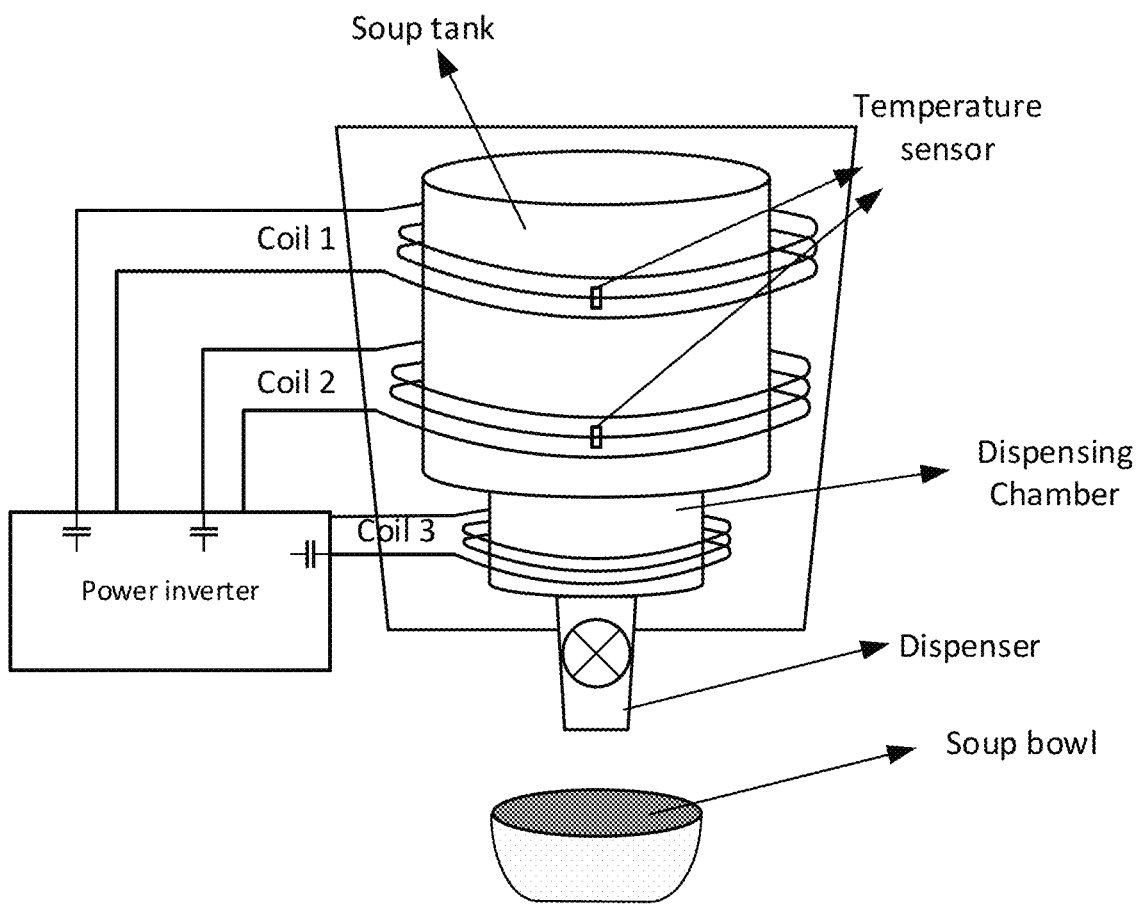
FIG. 13 is a schematic diagram of a first structure of the induction heating system configured as a dispensing system.

FIG. 13 displays a first structure of a dispensing soup well. In this structure, the dispensing soup well includes a soup tank and a dispensing chamber located underneath the soup tank. A control valve (manual or automatic) is connected with the dispensing chamber. The controller controls the power inverter to hold the soup tank (the second heating zone) at a first temperature through coil 1 and coil 2 (the second coil), and a higher temperature at the dispensing chamber (the first heating zone) through coil 3 (the first coil). Moreover, the dispensing soup well also includes temperature sensors correlated to each coil to detect the temperature of the location so that the controller can control the power inverter to deliver the power accordingly. The dispensing soup well may also include a position sensor that detects the presence and/or size of dispensing vessels (soup bowls). In this structure, the dispensing soup well can provide extra heat of the soup before dispensing and/or automatically dispense a correct amount of soup according to the size of the vessels.

Figure 14:
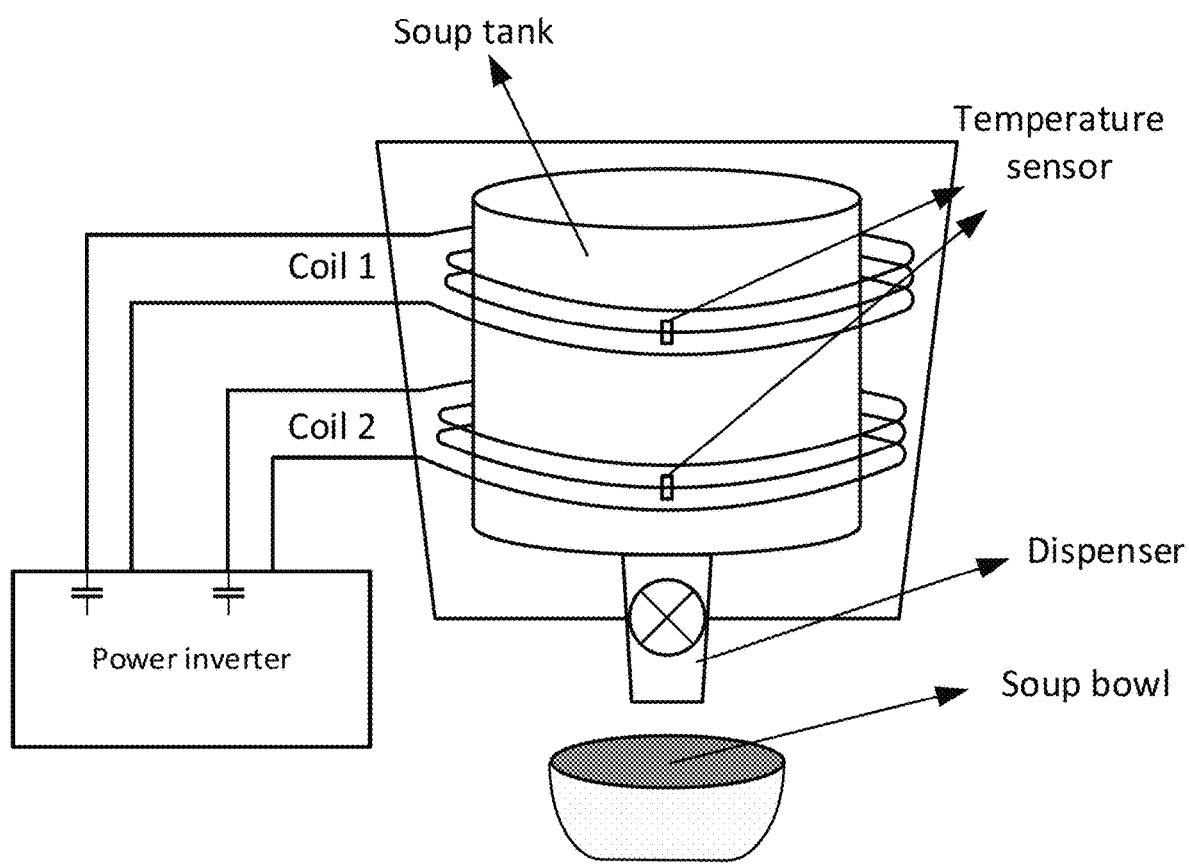
FIG. 14 is a schematic diagram of a second structure of the induction heating system configured as a dispensing system.

FIG. 14 displays a second structure of the dispensing soup well. In this structure, the dispensing soup well includes a soup tank and a control valve (manual or automatic) located underneath the soup tank. The controller controls the inverter to hold the soup tank at a temperature setpoint through coil 1 and coil 2. Moreover, the dispensing soup well also includes temperature sensors correlated to each coil to detect the temperature of the location so that the controller can control the power inverter to deliver the power accordingly. The dispensing soup well may also include a position sensor that detects the presence and/or size of dispensing vessels (soup bowls). In this structure, the dispensing soup well can provide extra heat of the soup before dispensing (with coil 2) and/or automatically dispense a correct amount of soup according to the size of the vessels.

The dispensing soup well may include a stirring mechanism such as stirring blades driven by electric motors. The configuration and operation methods can be selected according to applications with no limitations.

Figure 15:
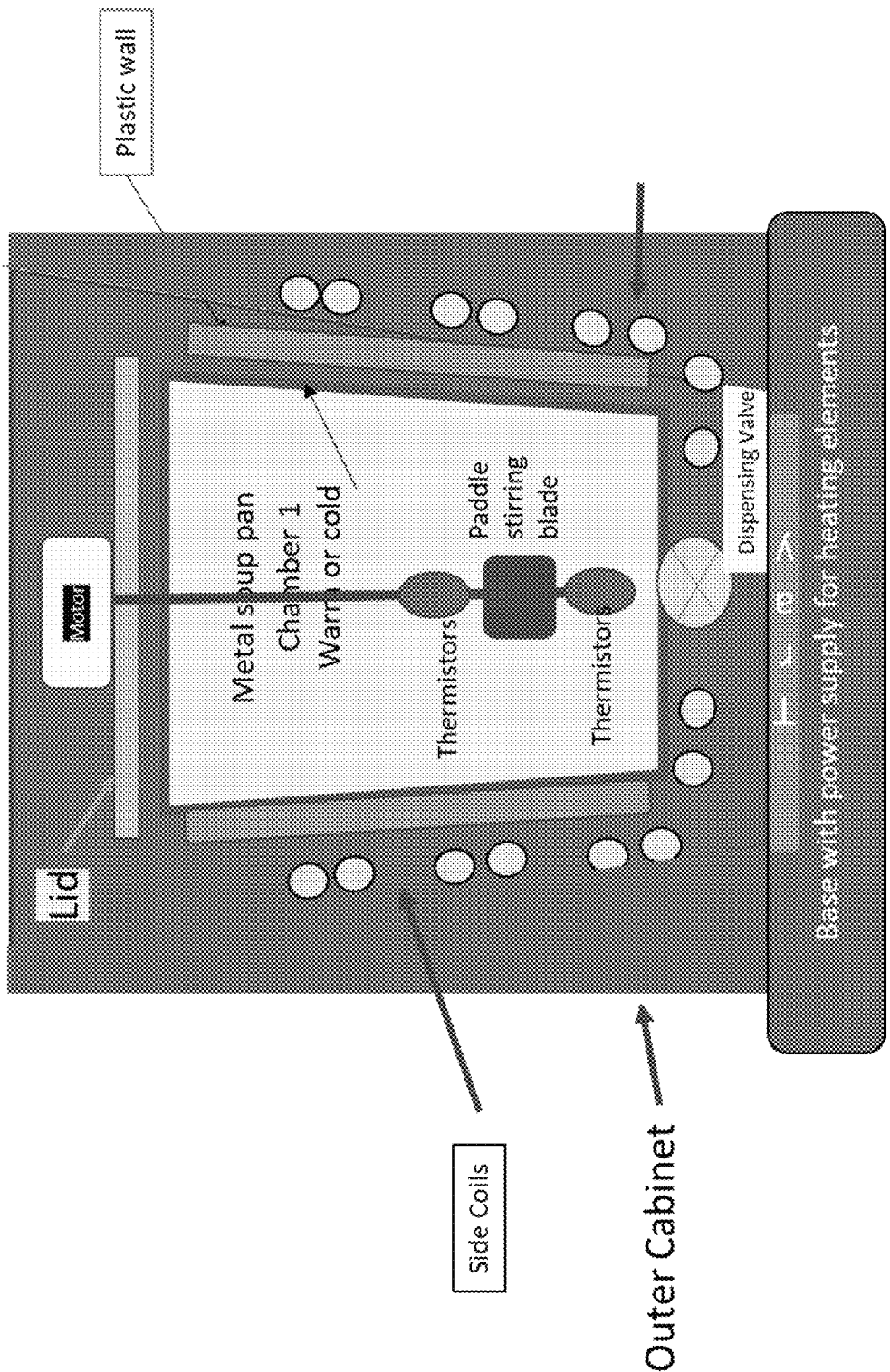
FIG. 15 is a schematic cross-sectional diagram of a first structure of the induction heating system configured as a soup well with a cabinet.

FIG. 15 displays a first structure of a soup well with a cabinet structure. The soup well includes two or more coils placed around the soup tank (side and/or bottom thereof) in the cabinet for heating or warming soup or other liquid food product. Thermal couples or thermistors (not presented in FIG. 15) can be attached to the side of the soup tank to measure the temperature and sent to the controller. The controller will regulate the power inverter output power based on the temperature signals to hold the soup tank at a desired temperature level. An electric motor is set in or on the lid of the container and connected with the controller. The axle of the motor connects to a stirring axle and has blades/mixers inside the soup tank. The motor, stir axle, and blades constitute a stirring mechanism. The controller sends signals to the motor to adjust the speed of the blades to change the stirring speed. There are also temperature sensors located in or along the stir axle, which directly measures the temperature of the soup and send back to the controller so that the control can vary the signal to the power inverter and motor to regulate the soup temperature and stirring speed for a better mixture. The controller can further adjust the temperature of the soup according to the density and temperature status (open or close). The food product (soup) can be dispensed at the valve at the preset temperature. In FIG. 15, the soup well also includes insulated (plastic) walls at the inside of the cabinet to hold the soup tank and provide insulation. There is also a bottom part for the power supply and electronics, which also supports the cabinet. The soup tank can be any metal container according to the applications.

Figure 16:
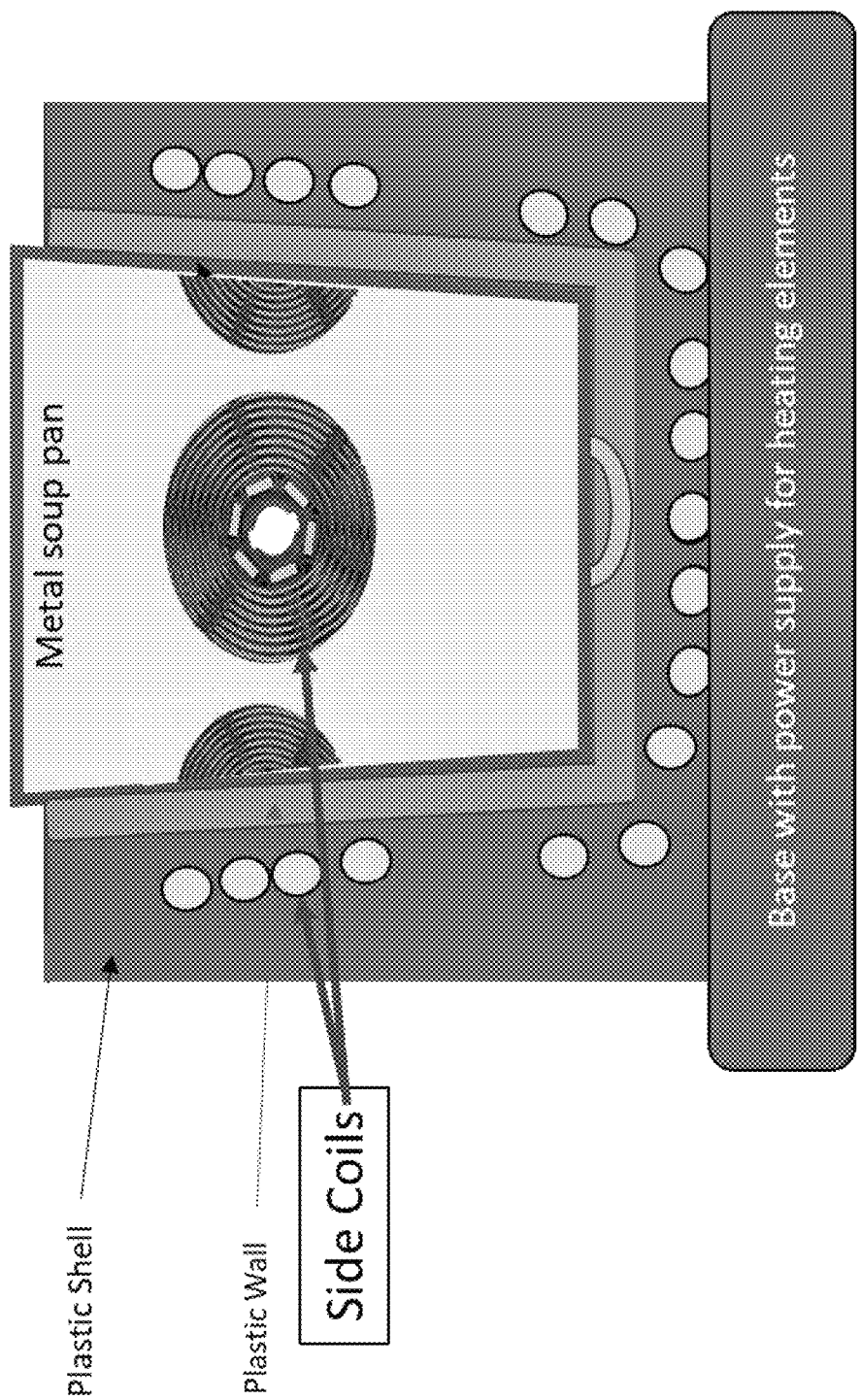
FIG. 16 is a schematic cross-sectional diagram of a second structure of the induction heating system configured as a soup well with a cabinet.

FIG. 16 displays a second structure of a soup well with a cabinet structure. The soup well includes two or more coils placed around the soup tank (sides and/or bottom thereof) in the cabinet for heating or warming the soup or other liquid food product. Thermal couples or thermistors (not presented in FIG. 16) can be attached to the side of the soup tank to measure the temperature and send to the controller. The controller will regulate the power inverter output power based on the temperature signals to hold the soup tank at the desired level. In FIG. 16, the soup well also includes insulated (plastic) walls at the inside of the cabinet to hold the soup tank and provide insulation. There is also a bottom part for the power supply and electronics, which also supports the cabinet. The soup tank can be any metal container according to the applications.

Figure 17:
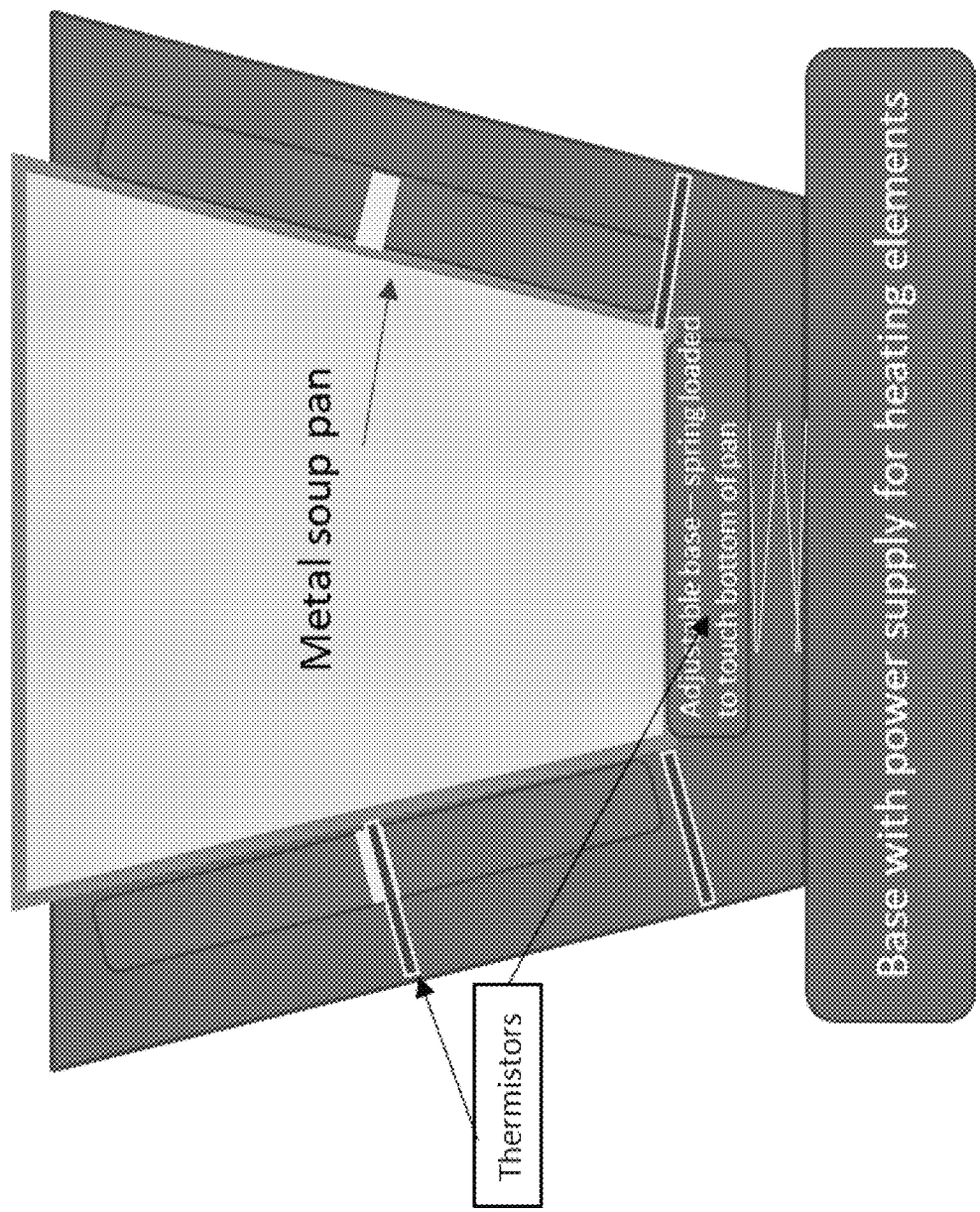
FIG. 17 is a schematic cross-sectional diagram of a third structure of the induction heating system configured as a soup well with a cabinet.

FIG. 17 shows a third structure of a soup well with a cabinet structure. The soup well includes one or more shaped castings (e.g., made of iron or aluminum) around the perimeter (bottom and side walls) of the soup container/pan, which fits with the soup container shell placed in the cabinet structure and is used to fix the soup well in place. The number of shaped castings can vary and each shaped casting can be disassembled to adapt to soup containers of different sizes. The shaped castings can be used with thermistors or induction heating elements. A temperature sensor such as a thermocouple or thermistor can be attached to the sidewall of the soup container to measure the temperature of the soup container and send the measured temperature signal to the controller. The controller can adjust the temperature according to the measured temperature signal by adjusting a control signal sent to the power inverter to control the output power. In some instances, the shaped castings can be split into multiple pieces or folded. Therefore, when the liquid level of the soup in the soup container is lower than a predetermined level, the shaped castings located in the upper part can be closed without heating. In FIG. 17, the bottom of the cabinet is also provided with a base that provides power for related electronic components, and this structure can also play a role in the casing of the cabinet. The upper surface of the base is also equipped with a spring, and an adjustable base (the same material as the casting) is connected above the spring. This structure can play a role in the bottom of the soup container when the soup container is placed in the cabinet. An elastic/biasing effect of the spring can ensure that the upper surface of the adjustable base is always in contact with the soup container, which can improve the heating efficiency to a certain extent. The above soup container can be a common metal container such as a soup pot, etc.

Figure 18:
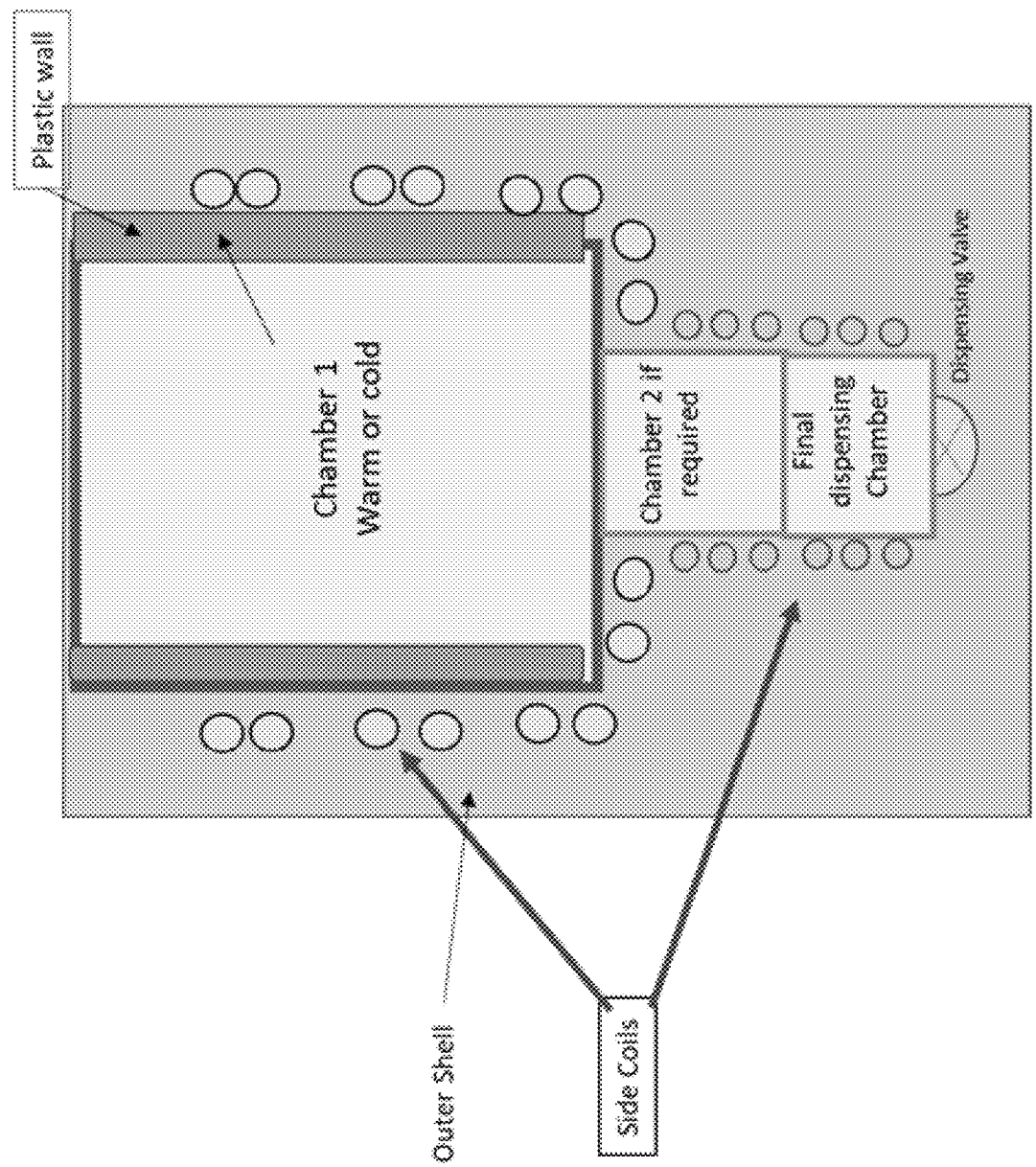
FIG. 18 is a schematic cross-sectional diagram of a structure of the induction heating system configured as a dispensing soup well.

FIG. 18 displays another structure of a dispensing soup well. In FIG. 18, chamber 1 is the main soup tank, dispensing chamber is the dispensing area, while chamber 2 is an optional transition area (can be included or not). The chamber 1, the chamber 2, and the dispensing chamber can be set from top to bottom. A dispensing valve (manual or automatic) is located at the bottom of the dispensing chamber. Coil 1 can be two or more coils at the side or the bottom of the chamber 1 to hold the soup in chamber 1 at a first temperature. Coil 2 can be two or more coils placed at the side of the chamber 2 to heat up the soup to a middle temperature (higher than the temperature in the chamber 1 but lower than dispensing chamber). Coil 3 can be two or more coils at the side of the dispensing chamber to heat up the soup to the desired dispensing temperature. Thermal couples or thermistors (not presented in FIG. 18) can be attached to the side of the chamber 1, the chamber 2, and/or the dispensing chamber to measure the temperature and send to the controller. The controller will regulate the power inverter output power based on the temperature signals to hold the soup tank at the desired level. In FIG. 18, insulation walls (plastic walls) are positioned at the inside of the dispensing soup well to hold the soup tank and provide insulation. In this structure, the dispensing soup well can preheat the soup in the transition chamber so as to increase the initial soup temperature for the dispensing chamber, further improving the heating efficiency before dispensing and ensure the stability of the heating process.

Figure 19:
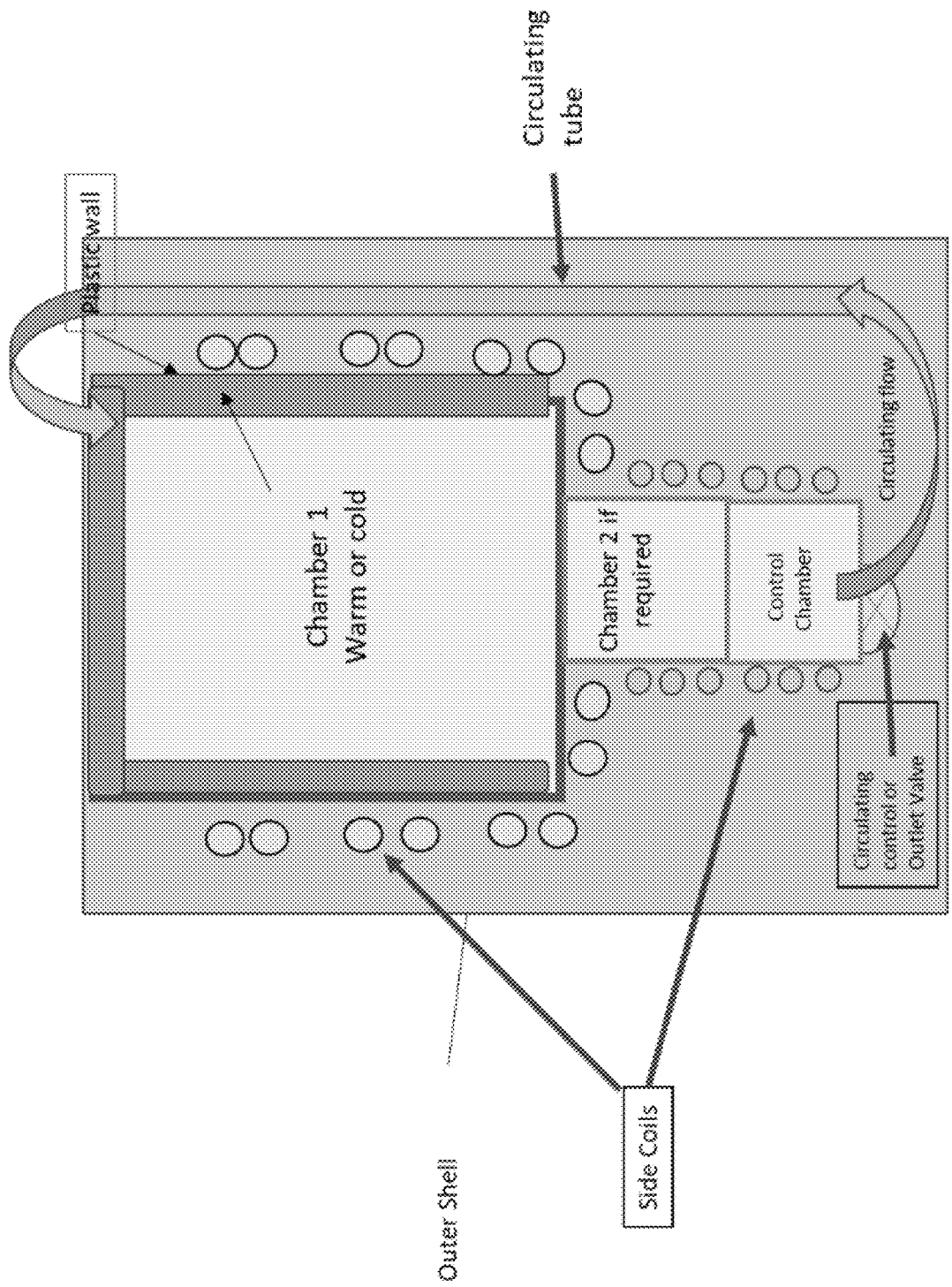
FIG. 19 is a schematic cross-sectional diagram of a structure of the induction heating system configured as a circulating soup well.

FIG. 19 displays a structure of a circulating soup well. In FIG. 19, chamber 1 is the main soup tank, control chamber is the cycling area, while chamber 2 is an optional transition area (can be included or not). The chamber 1, the chamber 2, and the control chamber can be set from top to bottom. The circulating soup well includes a control valve located at the bottom of the control chamber (controlled by a controller) that is connected with a tube to cycle the soup back to the chamber 1. The control valve can control if the soup needs to be cycle back to chamber 1 or can be dispensed. Coil 1 can be two or more coils at the side or the bottom of the chamber 1 to hold the soup in chamber 1 at a first temperature. Coil 2 can be two or more coils placed at the side of chamber 2 to heat up the soup to a middle temperature (higher than the temperature in the chamber 1 but lower than control chamber). Coil 3 can be two or more coils at the side of the control chamber to heat up the soup to the desired dispensing temperature. Thermal couples or thermistors (not presented in FIG. 18) can be attached to the side of the chamber 1, the chamber 2, and the control chamber to measure the temperature and send to the controller. The controller will regulate the power inverter output power based on the temperature signals to hold the soup tank at the desired level. In FIG. 18, insulation walls (plastic walls) are positioned at the inside of the circulating soup well to hold the soup tank and provide insulation. In this structure, the circulating soup well can preheat the soup in the transition chamber so as to increase the initial soup temperature for the control chamber, further improving the heating efficiency before dispensing and ensure the stability of the heating process.

Figure 20:
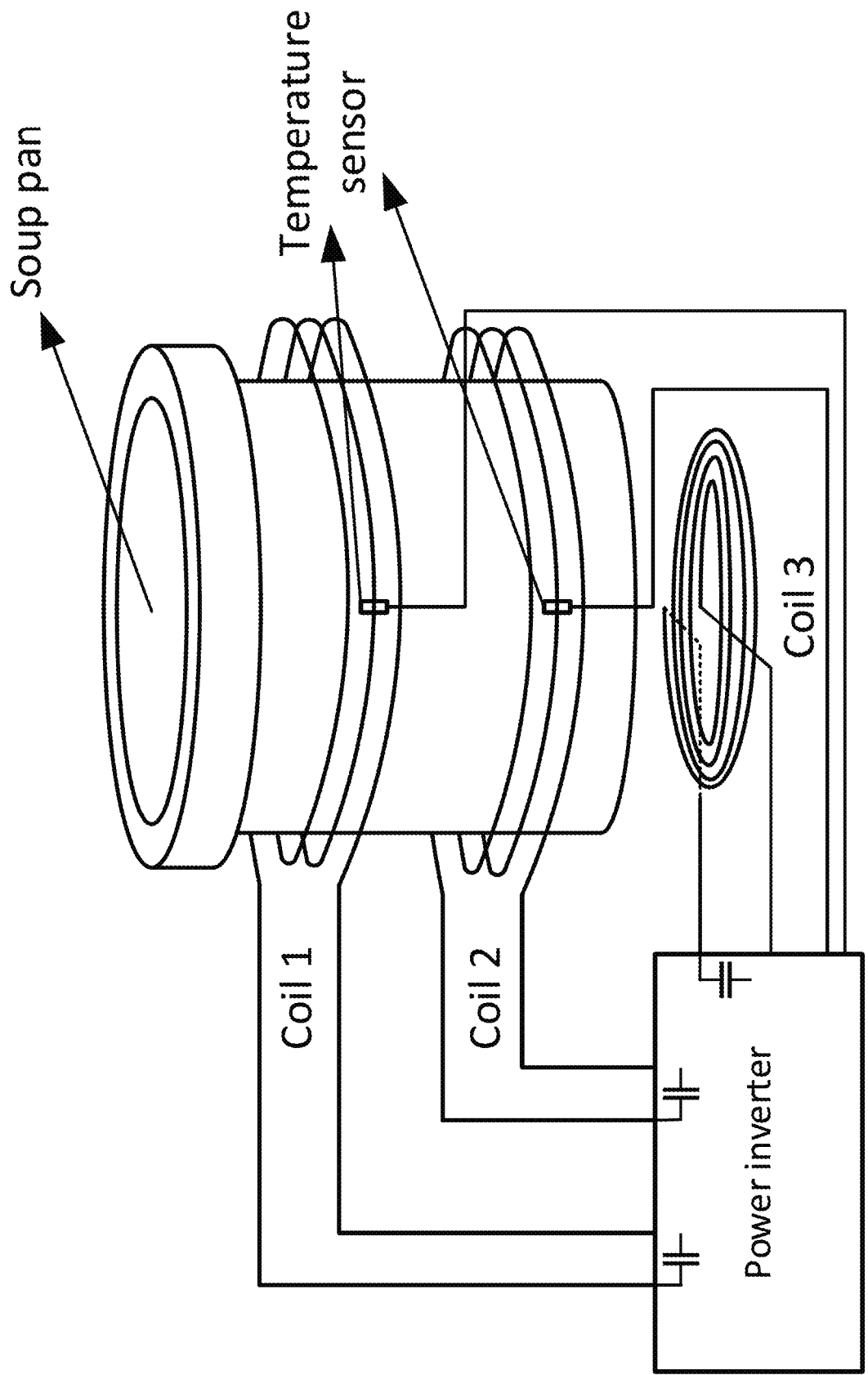
FIG. 20 is a schematic diagram of a first structure of the induction heating system configured as a soup well.

FIG. 20 displays another structure of a soup well. In this structure, coil 1 and coil 2 surrounds the side perimeter of the soup pan (a metal container), while coil 3 is placed horizontally underneath the bottom of the soup pan. The controller controls the inverter to hold the soup tank at a desired temperature through coil 1, coil 2, and coil 3. Moreover, the soup well may also include temperature sensors correlated to each coil to detect the temperature of the location so that the controller can control the power inverter to deliver the power accordingly.

Figure 21:
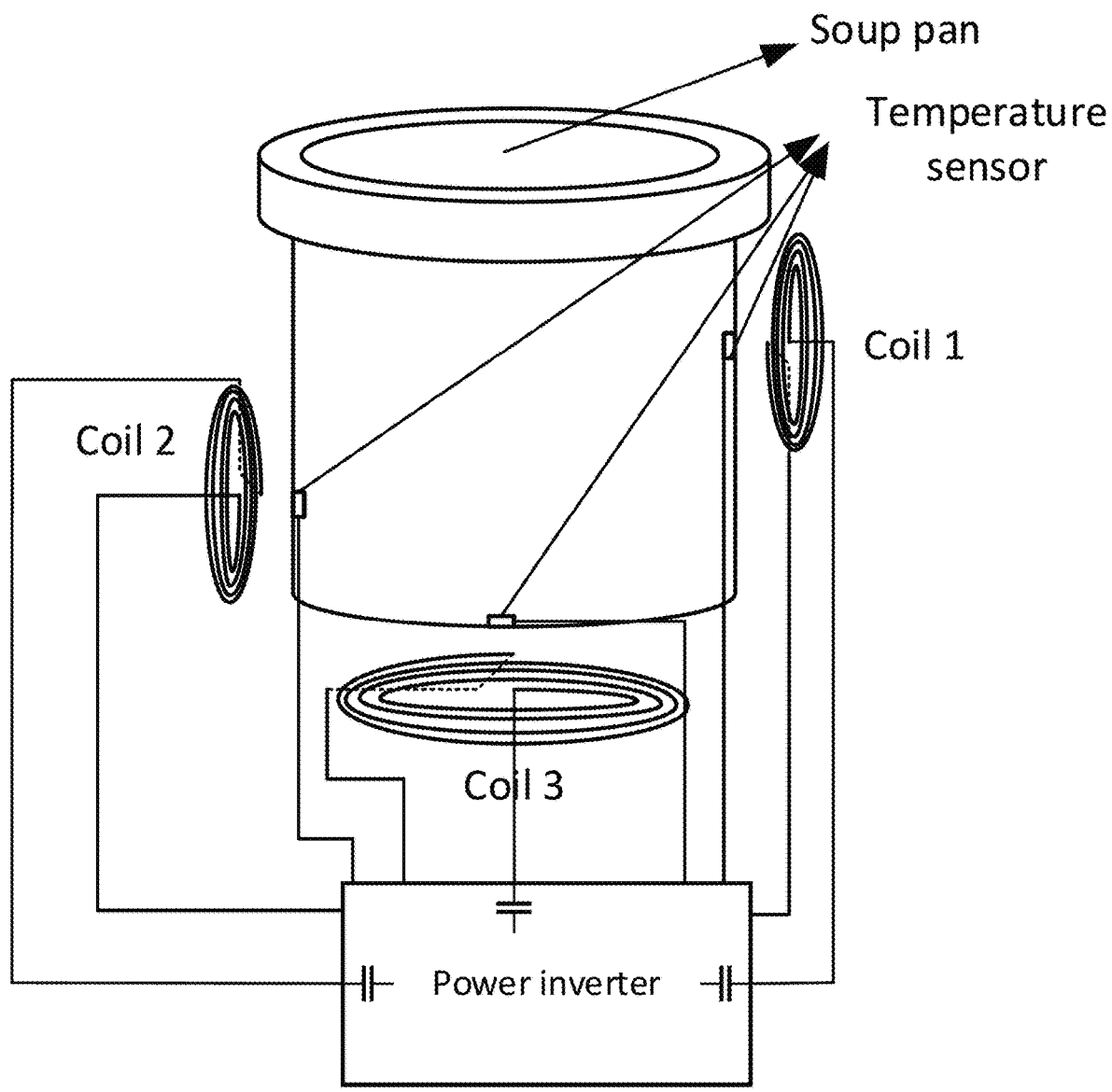
FIG. 21 is a schematic diagram of a second structure of the induction heating system configured as a soup well.

FIG. 21 displays another structure of a soup well. In this structure, coil 1 and coil 2 are placed vertically at different locations of the side of the soup pan (metal container), while coil 3 is placed horizontally underneath the bottom of the soup pan. The controller controls the power inverter to hold the soup tank at a desired temperature through coil 1, coil 2, and coil 3. Moreover, the soup well may include temperature sensors correlated to each coil to detect the temperature of the location so that the controller can control the inverter to deliver the power accordingly.

Figure 22:
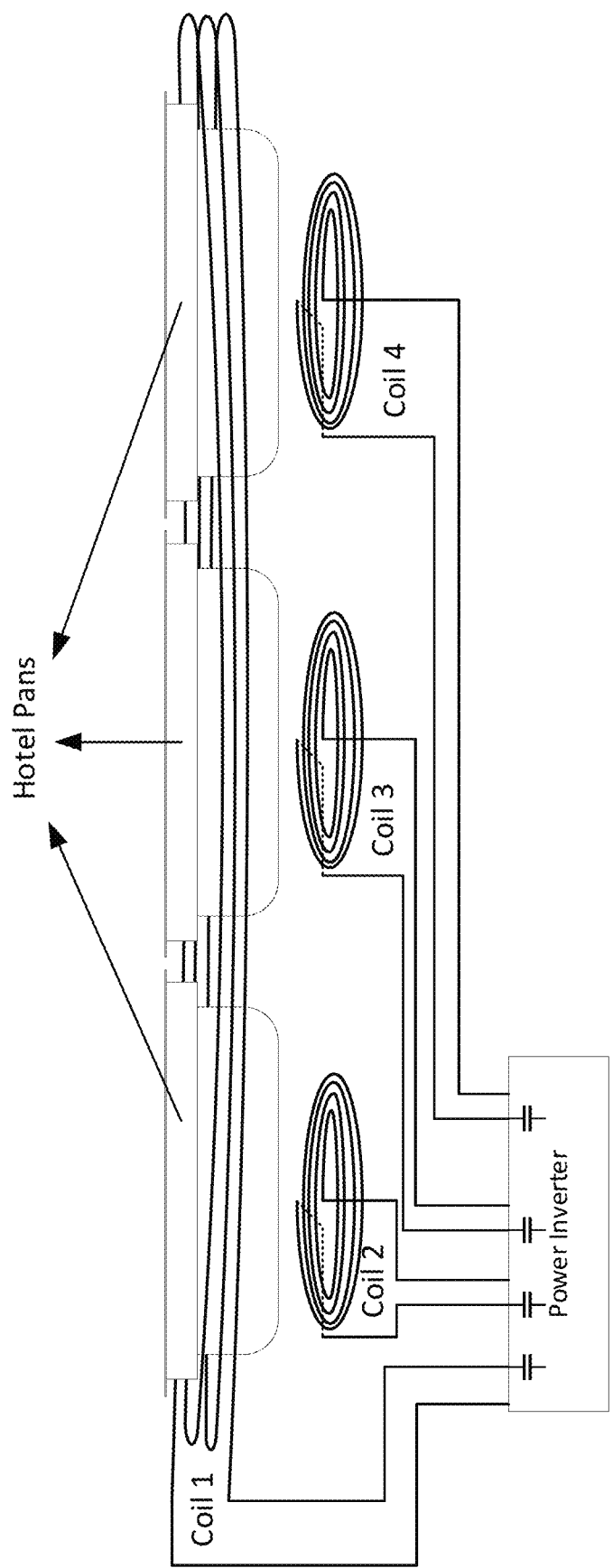
FIG. 22 is a schematic diagram of a first structure of the induction heating system configured as a dry well.

FIG. 22 displays a first structure of a dry well. In this structure, coil 1 surrounds the side of three hotel pans (e.g., metal containers, 4-inch depth preferred), while coil 2, coil 3, and coil 4 are placed horizontally underneath the bottom of each hotel pan correspondingly. The controller controls the power inverter to hold the hotel pans at a desired temperature through coil 1, coil 2, coil 3, and coil 4.

Figure 23:
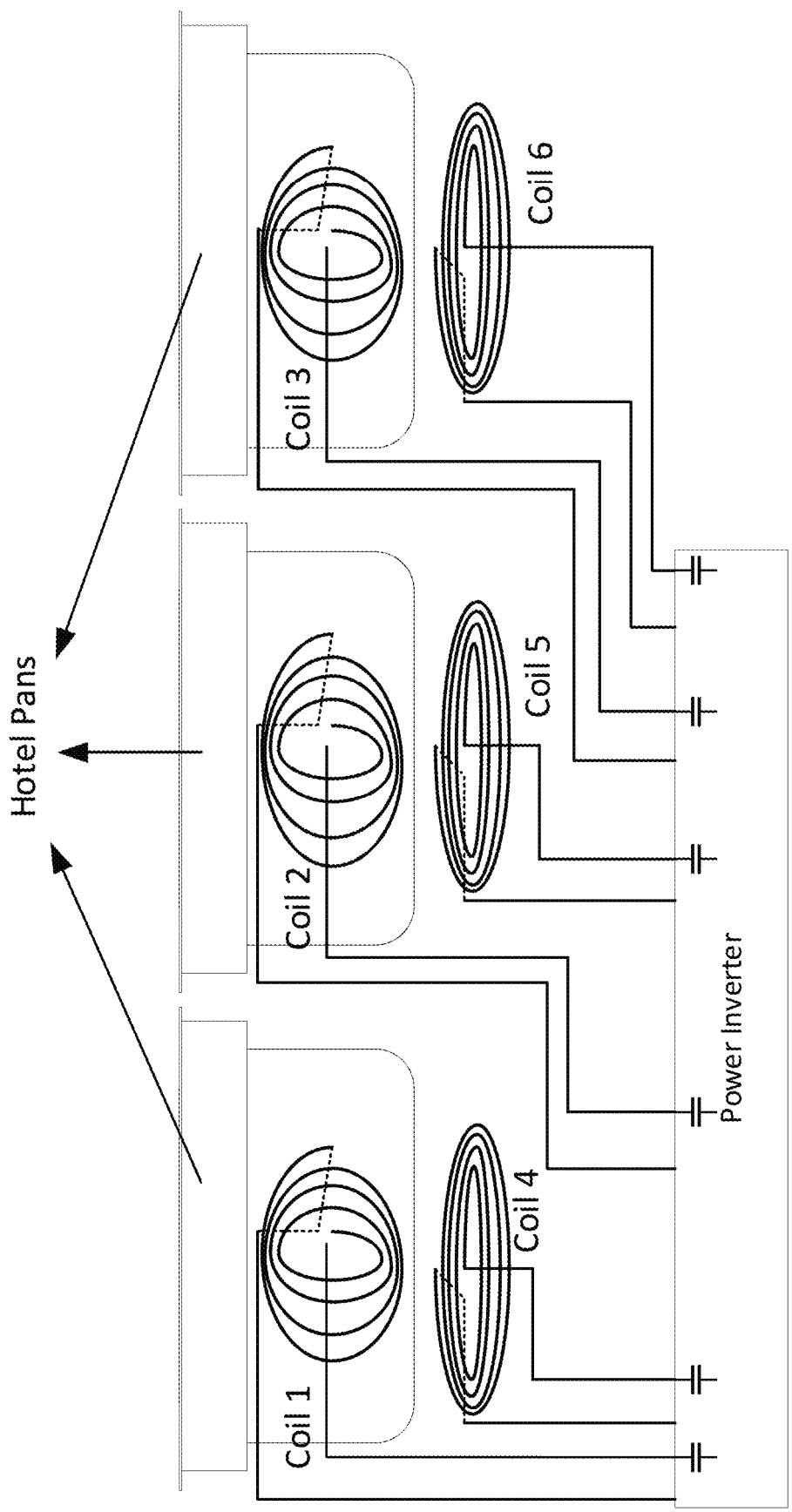
FIG. 23 is a schematic diagram of a second structure of the induction heating system configured as a dry well.

FIG. 23 displays a second structure of a dry well. In this structure, coil 1, coil 2, and coil 3 are positioned vertically at the side of different hotel pans respectively (e.g., metal containers, 6-inch depth preferred), while coil 4, coil 5, and coil 6 are placed horizontally underneath the bottom of each hotel pan correspondingly. The controller controls the power inverter to hold the hotel pans at a desired temperature through coil 1, coil 2, coil 3, coil 4, coil 5, and coil 6.

Figure 24:
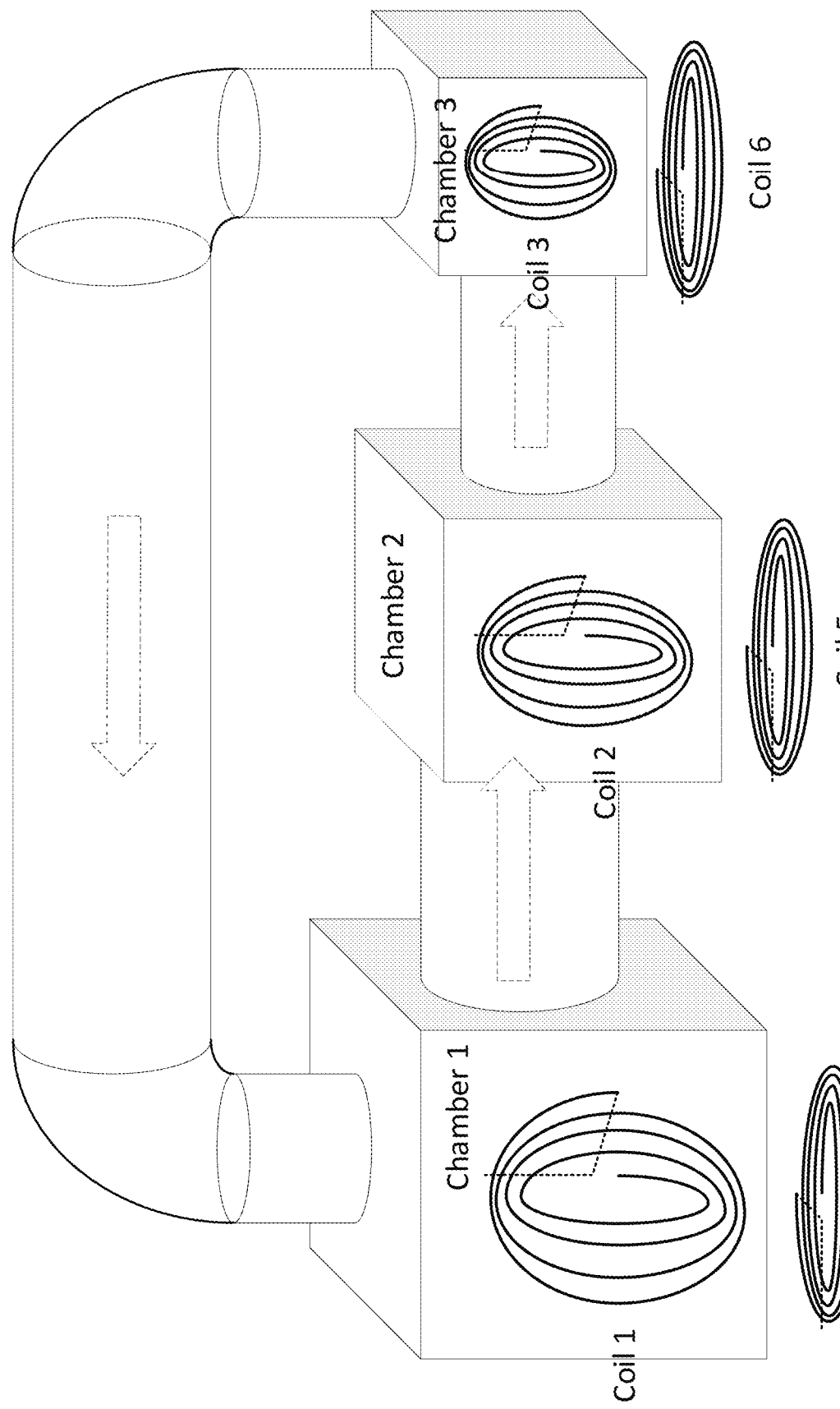
FIG. 24 is a schematic diagram of a first structure of the induction heating system configured as a liquid heating system.

FIG. 24 displays a first structure of a liquid dispensing and/or circulating tank. In this structure, coil 1, coil 2, and coil 3 are positioned vertically at the side of different chambers respectively, while coil 4, coil 5, and coil 6 are positioned horizontally underneath the bottom of each chamber correspondingly. Coil 1 and coil 4 heat chamber 1, coil 2 and coil 5 heat chamber 2, and coil 3 and coil 6 heat chamber 3. The controller controls the power inverter to heat the chambers through coil 1, coil 2, and coil 3, coil 4, coil 5, and coil 6 to maintain different temperatures of each chamber. For example, chamber 1 (as the main chamber) can have the lowest temperature and chamber 3 can have the highest temperature, while chamber 2 has a temperature in between the temperatures of chamber 1 and chamber 3. In this case, the liquid can be heated to maintain the liquid at a certain temperature. If the liquid temperature needs to be increased, the liquid can be pushed into chamber 2 and chamber 3 through the tubes to get secondary or third heat. Moreover, the liquid in chamber 3 can be circulated back to chamber 1 through tubes to further increase the main chamber liquid temperature.

Figure 25:
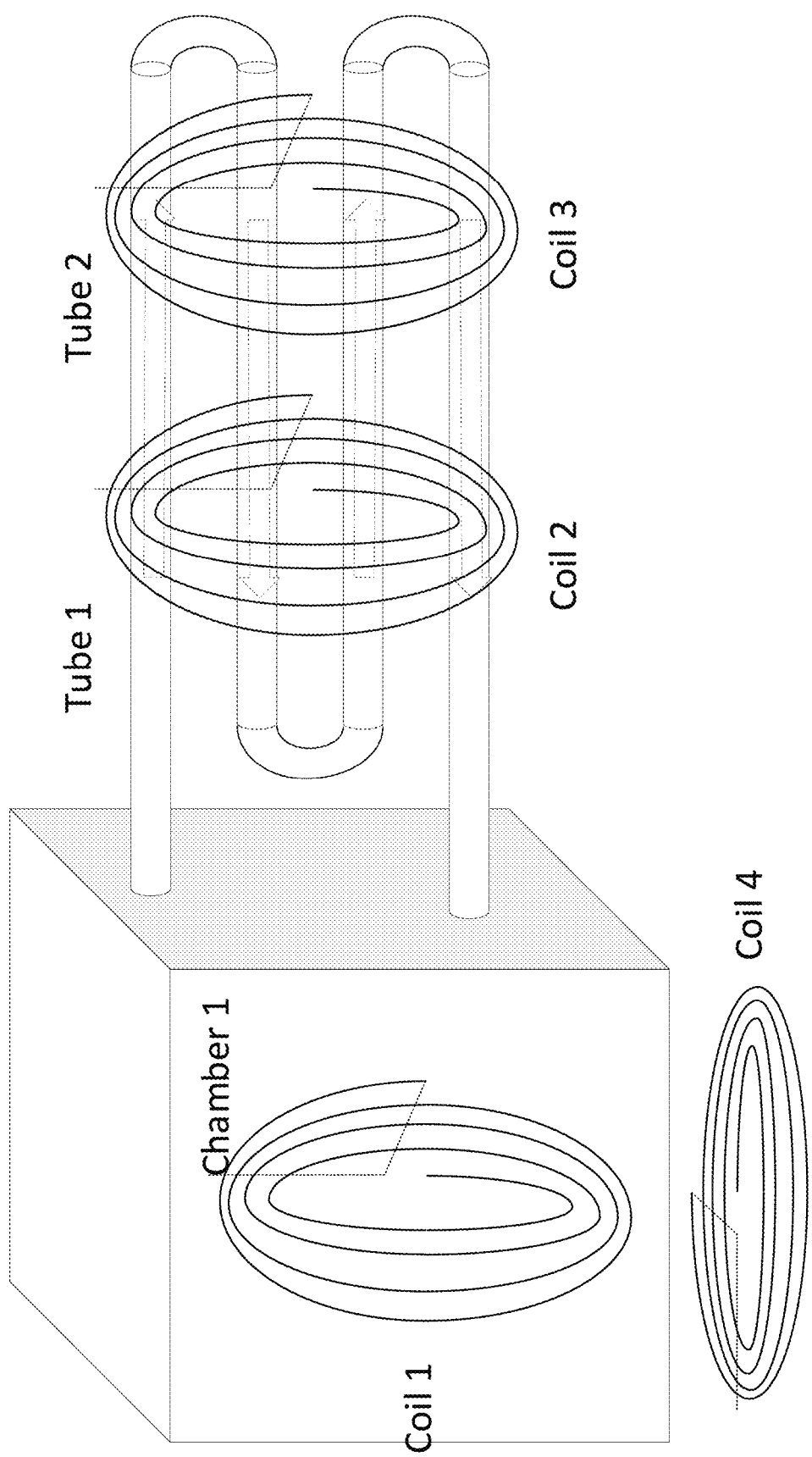
FIG. 25 is a schematic diagram of a second structure of the induction heating system configured as a liquid heating system.

FIG. 25 displays a second structure of a liquid dispensing and/or circulating tank. In this structure, coil 1 is positioned vertically at the side of the tank chamber, while coil 4 is positioned horizontally underneath the bottom of the chamber. Coil 2 and coil 3 are placed at different locations surrounding the circulating tubes. The controller controls the power inverter to heat the chamber through coil 1 and coil 4, and the circulating tubes through coil 2 and coil 3, to maintain different temperatures at different locations. For example, chamber 1 (as the main chamber) can have the lowest temperature while the tubes can have a higher temperature. In this case, the liquid can be heated to maintain the liquid at a certain temperature. If the liquid temperature needs to be increased, the liquid will be pushed into the circulating tubes to get secondary heat, which is higher than the main chamber liquid temperature. The liquid in circulating tubes flow back to the main chamber to further increase the main chamber liquid temperature.

In other embodiments of the appliance application, the appliance includes a plate or pan warmer, a griddle, a double-sided griddle, a panini grill, a plancha, a toaster, a conveyor toaster, or an egg cooker. Such an appliance includes one or more griddles or one or more three-dimensional metal food or liquid containers, a plurality of induction coils, one or more capacitors, at least two power switches, a single power inverter, and a controller.

The heating surface comprises different heating zones where different coils are used to heat different zones. The griddle or the three-dimensional container not only can be common shapes such as rectangular, round etc., but it can also be any special structure that creates a cavity or net, which can be decided according to the appliance. The induction coils can be any electro-magnetic generating coils with different diameters, lengths, materials, winding methods, etc. Different coils connect in series with different capacitors to form different resonant circuits to generate heating energy. Different resonant circuits connect in series with different power switches to form different power branches to deliver power. At least two power branches are connected in parallel to one inverter. The controller is used to send control signals to the power inverter and control the switching frequency of the power inverter as well as the turn-on time of different power branches.

To further simplify the description, the above heating zones are categorized as a first heating zone and a second heating zone and the coils are separated as a first coil and a second coil. The first coil is used to heat the first heating zone and the second coil is used to heat the second heating zone. The first coil and second coil form different resonant circuits with connection in series of different capacitors. Different resonant circuits connect in series with different power switches to form different power branches. All power branches are connected in parallel to one power inverter. The controller is used to send control signals to the power inverter and control the switching frequency of the power inverter as well as the turn-on time of different power branches.

In this appliance application, the induction heating system only contains one power inverter, reducing the component counts for the power inverter and relevant parts, lowering the system complexity and cost while maintaining system reliability. Furthermore, with the individual control with the coils at different locations, the system is flexible with combinations of different applications and shapes of plates, so as to adjust the heating methods, reducing the system energy consumption and increasing the adaptivity of the system.

Moreover, the heating surface is preferred to be flat for better heating.

For ease of control, the control signal comprises temperature setpoints for the first heating zone and the second heating zone. Upon receiving the control signals, the power inverter can at least deliver the power to the first coil or the second coil so as to maintain the temperatures at the setpoints.

The appliance further includes one or more metal plates disposed along the heating surface. The metal plates are disposed above or adjacent to the plurality of induction coils.

The controller is configured to vary the signal based on a predetermined power control algorithm. The predetermined power control algorithm is configured to achieve a desired temperature at the first heating zone or the second heating zone.

The appliance includes a temperature sensor coupled to the controller and one of (a) disposed in the first heating zone or the second heating zone, (b) configured to directly or indirectly monitor the temperature of a food product associated with at least one of the griddle or the three-dimensional container, or (c) in direct or indirect contact with the heating surface and thereby positioned to directly or indirectly monitor the temperature of the heating surface. Therefore, the temperature sensor may (1) directly measure the temperature of the food; (2) indirectly measure the temperature of the food through the heating surface; (3) directly measure the temperature of the heating surface by directly contacting the heating surface; and/or (4) indirectly measure the temperature of the heating surface. In order to enable different temperature sensors to realize different functions, the arrangement of temperature sensors is similar to the corresponding content above, which will not be repeated here. The allocation of the temperature sensors can be adjusted according to the control requirements to realize different functions.

The temperature sensor is in at least one of direct or indirect contact with the heating surface and the temperature sensor is configured to provide signals relating to a detected temperature to the controller. The controller is configured to vary the signal provided to the single power inverter based on the signals from the temperature sensor.

The controller is configured to vary the signal provided to the single power inverter based on a desired temperature at the first heating zone or the second heating zone. The temperature sensor is in direct or indirect contact with the heating surface and thereby positioned to directly or indirectly monitor the temperature of the heating surface. The temperature sensor is disposed proximate the first induction coil or the second induction coil.

The appliance may include a toaster conveyor mechanism to move the food product over the heated metal plate or to move two or more metal plates in a vertical or horizontal plane close to or in contact with the food product to heat the two sides of the food product. The toaster mechanism then dispenses the finished product via a conveyor or mechanical means.

To improve the user experience, a position sensor may be coupled to the controller and configured to provide signals to the controller. The controller is configured to determine the presence or absence of a food vessel within the first heating zone or the second heating zone based on the signals from the position sensor. This method can help the operator be aware of the position of the heating vessels and make sure they are placed at the correct position for quality heating.

The appliance may include a housing configured to hold the one or more flat metal plates. The housing can be any shape of mechanism only to ensure the plates and controller are firmly supported.

To further protect the controller and other electronics components, the appliance may include an insulator configured to thermally isolate the controller from the one or more flat metal plates.

Figure 26:
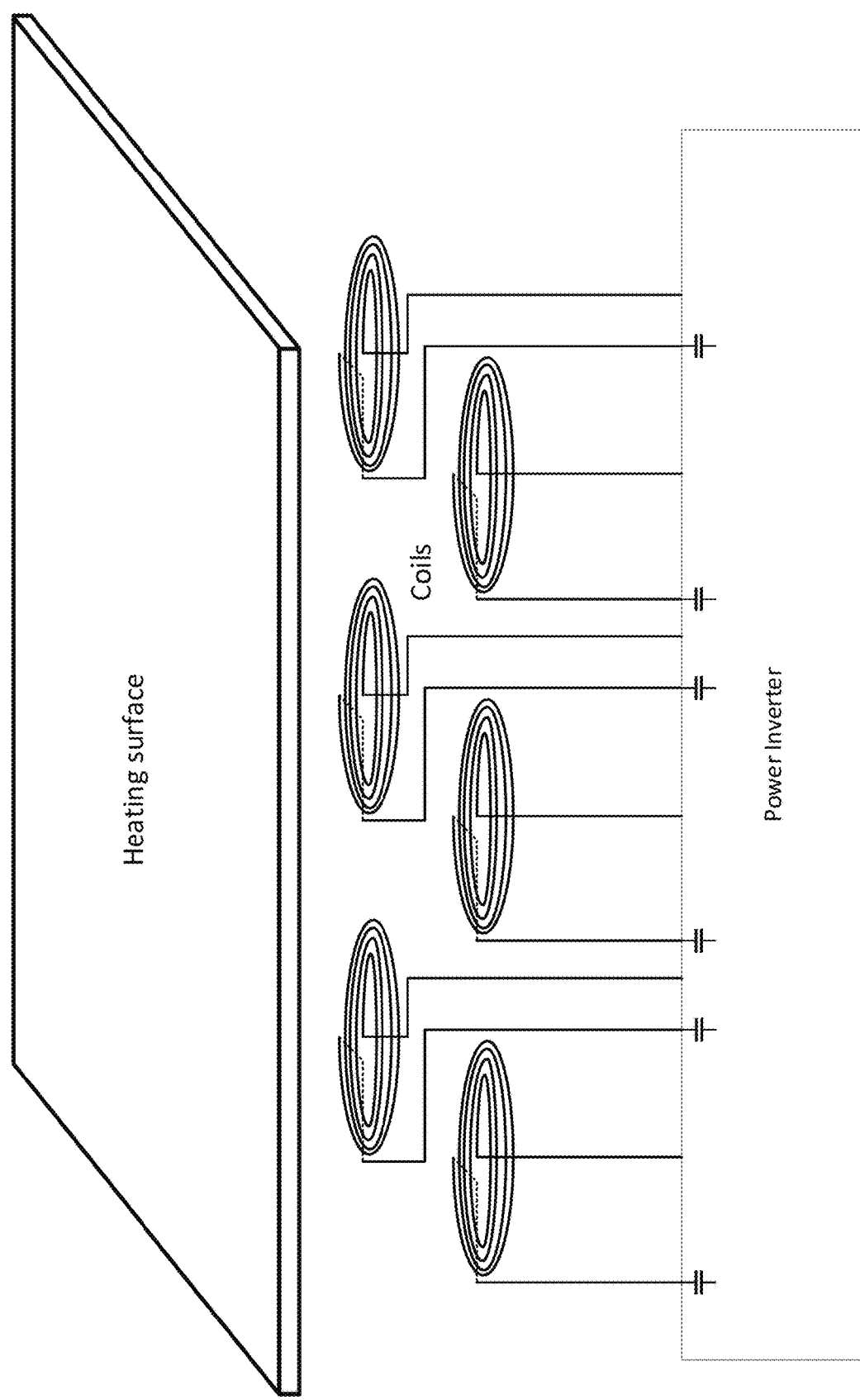
FIG. 26 is a schematic diagram of a structure of the induction heating system configured as an induction griddle, plancha, or plate warmer.

FIG. 26 displays a structure of a plate or pan warmer, a griddle, or a plancha. In this structure, the coils are placed in an array horizontally underneath the heating surface (metal plate shown). When food or food vessels are placed at certain locations of the heating surface, the temperature at such locations will drop significantly. The temperature sensors at those locations (not shown in FIG. 26, preferred to be directly touching the heating surface) sense the temperature (real-time measurements) and feedback to the controller. The controller adjusts the power inverter to deliver power to the locations based on the temperature signals. This design provides individual power control at different locations, avoiding the unnecessary energy consumption to operate all coils simultaneously, improving the heating efficiency and performance.

Figure 27:
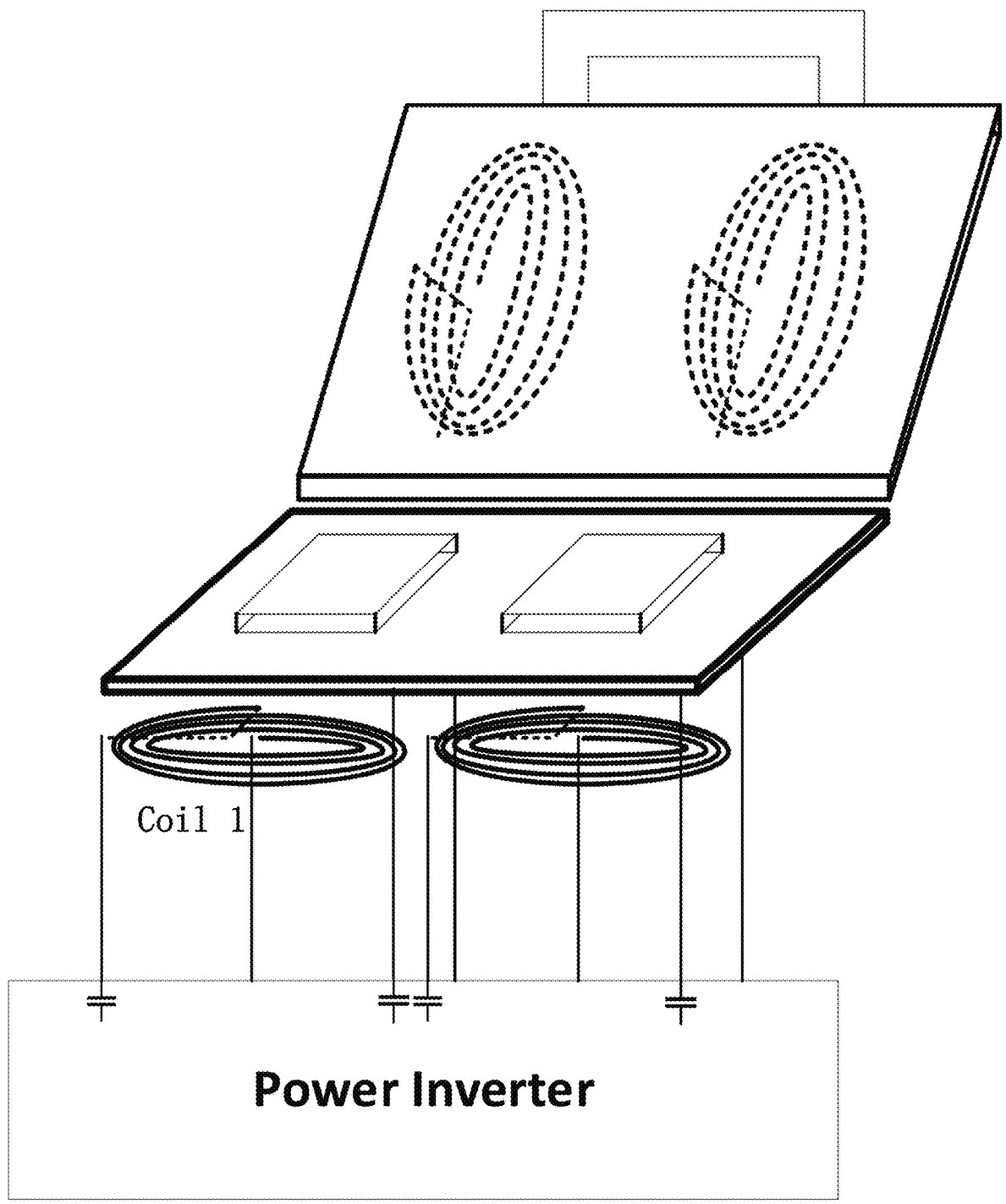
FIG. 27 is a schematic diagram of a structure of the induction heating system configured as a double-sided griddle or panini grill.

FIG. 27 displays a structure of a double-sided griddle or a panini grill. In this structure, metal plate 1 and metal plate 2 are connected with an opening-closing mechanism (e.g., a hinge, etc.). Coil 1 and coil 2 are placed underneath metal plate 1, while coil 3 and coil 4 are placed in the similar location of metal plate 2. When metal plate 1 and metal plate 2 are closed together, coil 3 aligns with coil 1 and coil 4 aligns with coil 2. When food is placed on the metal plate 1 (one heating surface), the temperature sensors directly touching the metal plate 1 (not shown in FIG. 27) sense the temperature and send it to the controller. The controller adjusts the power inverter to deliver power to coil 1 or coil 2 so as to heat one side of the food. When the food needs to be heated double-sided, metal plate 1 and metal plate 2 are closed together, the temperature sensors directly touching the metal plate 1 and metal plate 2 (not shown in FIG. 27) sense the temperature and send it to the controller. The controller adjusts the power inverter to deliver power to coil 1, coil 2, coil 3, and/or coil 4 so as to heat both sides of the food. This design provides individual power control at different locations, avoiding the unnecessary energy consumption to operate all coils simultaneously, improving the heating efficiency and performance and providing a single-sided or a double-sided heating feature.

Figure 28:
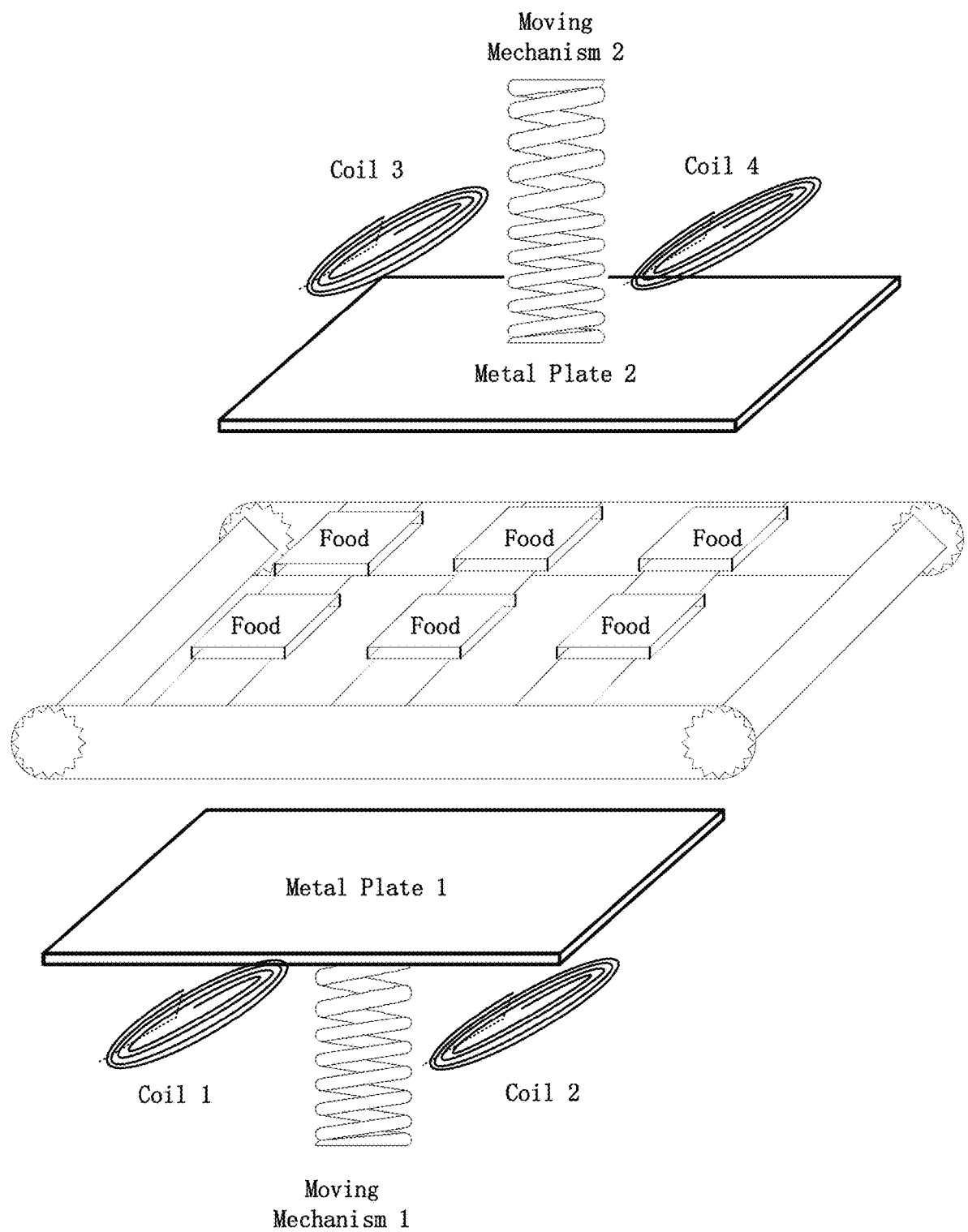
FIG. 28 is a schematic diagram of a first structure of the induction heating system configured as a toaster or a conveyor toaster.

FIG. 28 displays a first structure of a toaster or a conveyor toaster. In this structure, metal plate 1 and metal plate 2 are placed horizontally on top and bottom. Coil 1 and coil 2 are placed underneath metal plate 1, while coil 3 and coil 4 are placed above metal plate 2. A conveyor mechanism (e.g., step motor conveyor, etc.) is placed in between metal plate 1 and metal plate 2. When food is placed on the conveyor mechanism, the temperature sensors directly touching the metal plate 1 (one heating surface) sense the temperature and send it to the controller. The controller adjusts the power inverter to deliver power to coil 1 or coil 2 so as to heat one side of the food. When the food needs to be heated double-sided, metal plate 1 and metal plate 2 are positioned close together, the temperature sensors directly touching the metal plate 1 and metal plate 2 (not shown in FIG. 28) sense the temperature and send it to the controller. The controller adjusts the power inverter to deliver power to coil 1, coil 2, coil 3, and/or coil 4 so as to heat both sides of the food. Moreover, the system can further include moving mechanism 1 and moving mechanism 2 to move metal plate 1 and metal plate 2 closer to the food to do the single-sided or double-sided heating. When the food is done, the conveyor mechanism can deliver the food to specific locations for distribution. This design provides individual power control at different locations, avoiding the unnecessary energy consumption to operate all coils simultaneously, improving the heating efficiency and performance and providing single-sided or double-sided heating feature.

Figure 29:
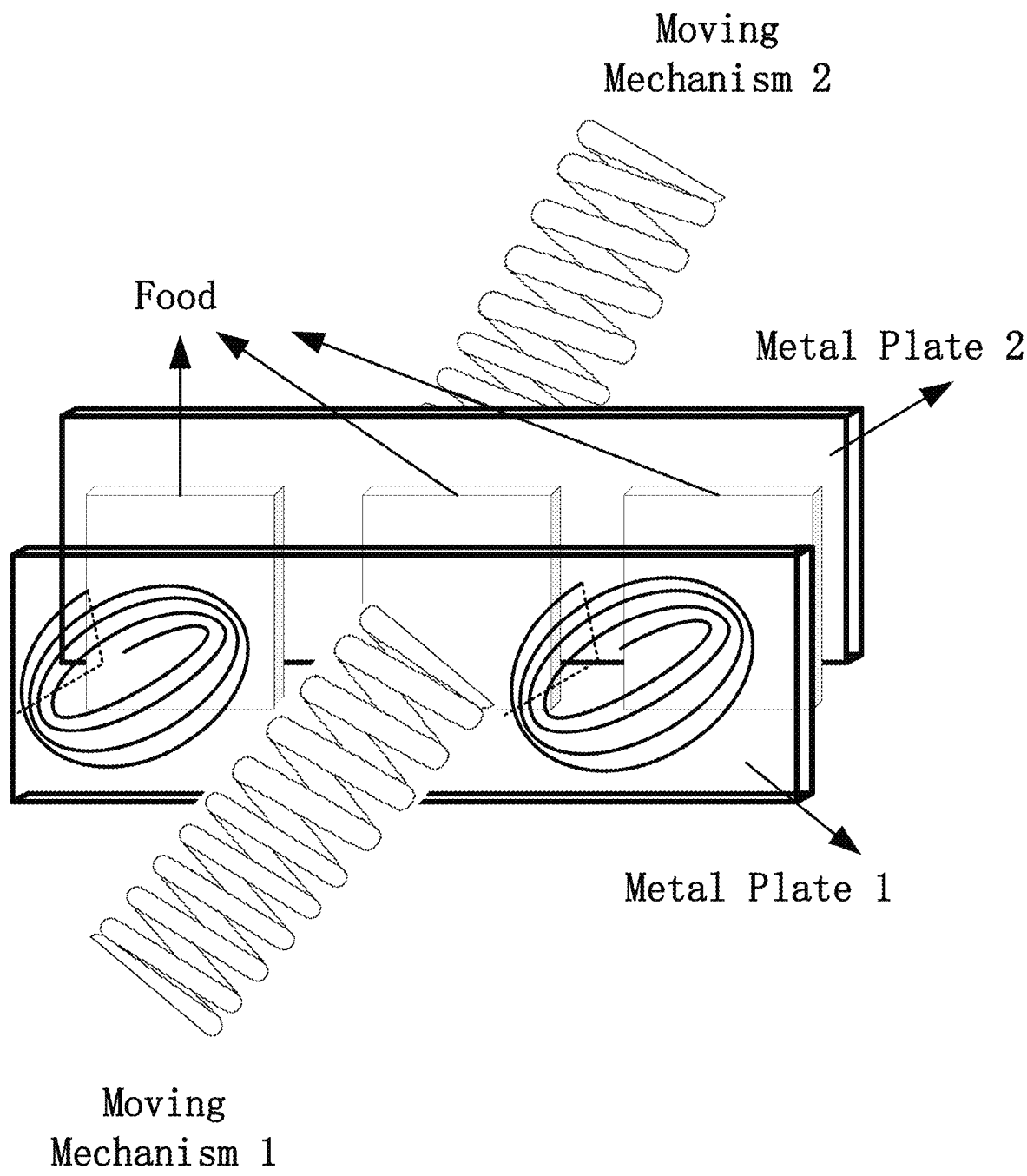
FIG. 29 is a schematic diagram of a second structure of the induction heating system configured as a toaster or a conveyor toaster.

FIG. 29 displays a second structure of a toaster or a conveyor toaster. In this structure, metal plate 1 and metal plate 2 are placed vertically on opposing sides. Coil 1 and coil 2 are placed at metal plate 1, while another two coils (not shown in FIG. 29) are placed in a similar location of metal plate 2. A fixture mechanism (not shown in FIG. 29, can be any common structures, such as bundling or clamping fixture, etc.) is placed in between metal plate 1 and metal plate 2 to hold the food for heating. When food is placed in the fixture, the temperature sensors directly touching the metal plate 1 (not shown in FIG. 28) sense the temperature and send it to the controller. The controller adjusts the inverter to deliver power to coil 1 or coil 2 so as to heat one side of the food. When the food needs to be heated double-sided, metal plate 1 and metal plate 2 are closed together, the temperature sensors directly touching the metal plate 1 and metal plate 2 (not shown in FIG. 28) sense the temperature and send it to the controller. The controller adjusts the power inverter to deliver power to coil 1, coil 2, coil 3, and/or coil 4 so as to heat both sides of the food. Moreover, the system can further comprise moving mechanism 1 and moving mechanism 2 to move metal plate 1 and metal plate 2 closer to the food to do the single-sided or double-sided heating.

Figure 30:
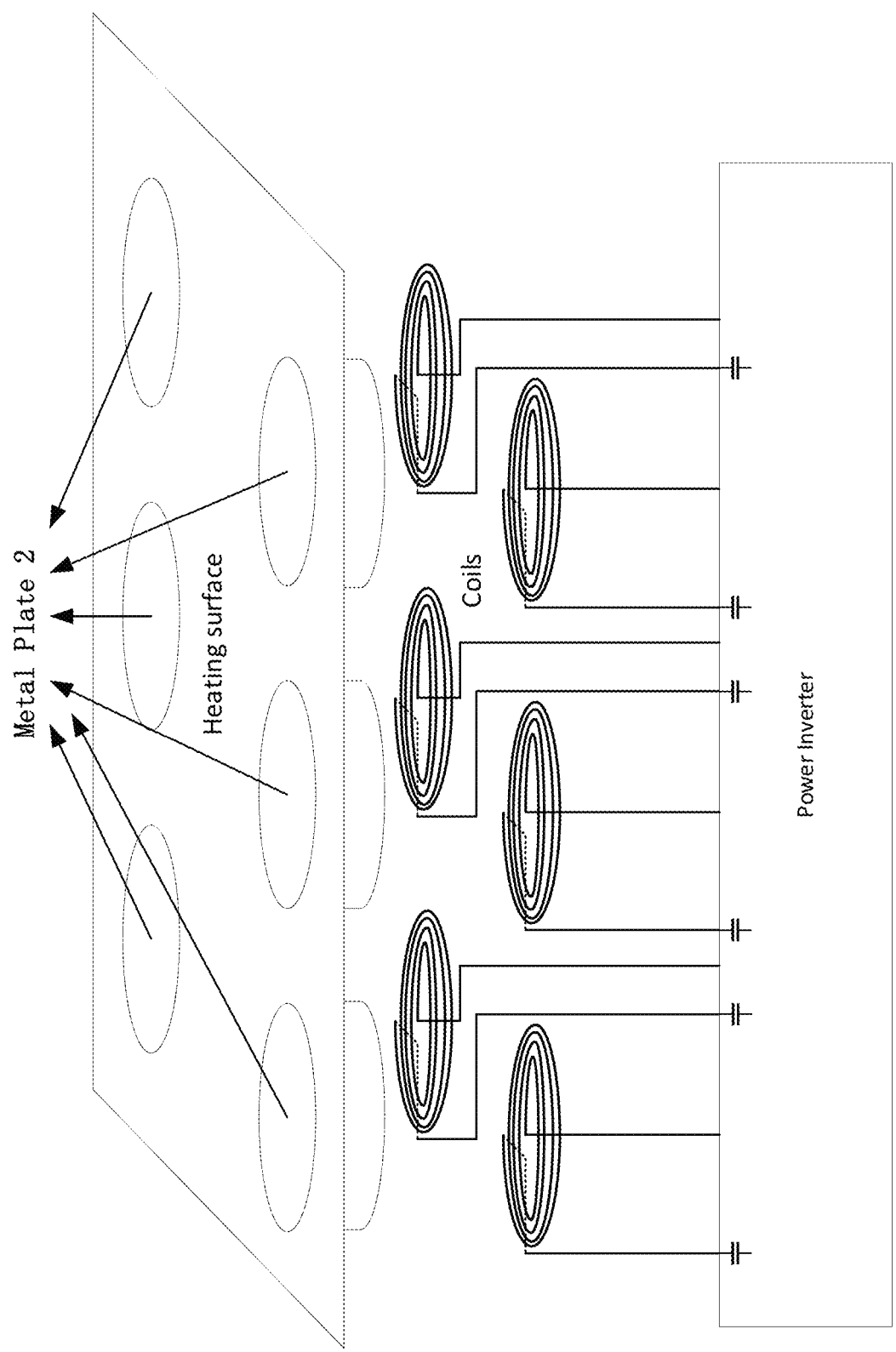
FIG. 30 is a schematic diagram of a structure of the induction heating system configured as an egg cooker.

FIG. 30 displays one structure of the egg cooker. In this structure, all the coils are placed in an array underneath the heating surface (a metal plate surface shown in FIG. 30). There are a plurality of recesses or stencils made for cooking the eggs on the heating surface. The coils are placed under each of the stencils respectively. If the egg is placed in a certain stencil, the temperature sensor (not shown in FIG. 30) at that location sends the temperature signal to the controller and the control adjust the power accordingly to cook the egg. If a certain stencil location is not under cooking (no egg placed or cooking is done), the controller can lower the power at the location to keep the temperature for the next cooking. If the location is not used anymore, the controller can completely stop the power at that location to save energy.

In other embodiments of the appliance application, the appliance includes a French hot top, an omelet maker, an egg maker, or an induction anywhere device. Such an appliance includes one or more griddles or one or more three-dimensional metal food or liquid containers, a plurality of induction coils, one or more capacitors, at least two power switches, a single power inverter, and a controller.

The heating surface comprises different heating zones where different coils are used to heat different zones. The griddle or the three-dimensional container not only can be common shapes such as rectangular, round, etc., but it can also be any special structure that creates a cavity or array, which can be decided according to the appliance. The induction coils can be any electro-magnetic generating coils with different diameters, lengths, materials, winding methods, etc. Different coils connect in series with different capacitors to form different resonant circuits to generate heating energy. Different resonant circuits connect in series with different power switches to form different power branches to deliver power. At least two power branches are connected in parallel to one power inverter. The controller is used to send control signals to the power inverter and control the switching frequency of the inverter as well as the turn-on time of different power branches.

To further simplify the description, the above heating zones are categorized as a first heating zone and a second heating zone and the coils are separated as a first coil and a second coil. The first coil is used to heat the first heating zone and the second coil is used to heat the second heating zone. The first coil and second coil forms different resonant circuit with connection in series of different capacitors. Different resonant circuits connect in series with different power switches to form different power branches. All power branches are connected in parallel to one power inverter. The controller is used to send control signals to the power inverter and control the switching frequency of the inverter as well as the turn-on time of different power branches.

In this appliance application, the induction heating system only contains one power inverter, reducing the component counts for the power inverter and relevant parts, lowering the system complexity and cost while maintaining system reliability. Furthermore, with the individual control with the coils at different locations, the system is flexible with combinations of different applications and shape of plates, so as to adjust the heating methods, reducing the system energy consumption, and increasing the adaptivity of the system.

Moreover, the heating surface is preferred to be flat for better heating.

For ease of control, the control signal comprises temperature setpoints for the first heating zone and the second heating zone. Upon receiving the control signals, the power inverter can at least deliver the power to the first coil or the second coil so as to maintain the temperatures at the setpoints.

The appliance may include a ceramic glass plate or other material to allow the magnetic field to pass through the surface to heat a metal pan, bowl, or other object and to provide insulation and improve safety. The glass plate may disposed between the materials being heated and the plurality of induction coils (the first coil and the second coil) to ensure the insulation.

The controller is configured to vary the signal based on a predetermined power control algorithm. The predetermined power control algorithm is configured to achieve a desired temperature at the first heating zone or the second heating zone.

The appliance includes a temperature sensor coupled to the controller and one of (a) disposed in the first heating zone or the second heating zone, (b) configured to directly or indirectly monitor the temperature of a food product associated with the griddle or the three-dimensional container, or (c) in direct or indirect contact with the heating surface and thereby positioned to directly or indirectly monitor the temperature of the heating surface. Therefore, the temperature sensor may (1) directly measure the temperature of the food; (2) indirectly measure the temperature of the food through the heating surface; (3) directly measure the temperature of the heating surface by directly contacting the heating surface; and/or (4) indirectly measure the temperature of the heating surface. In order to enable different temperature sensors to realize different functions, the arrangement of temperature sensors is similar to the corresponding content above, which will not be repeated here. The allocation of the temperature sensors can be adjusted according to the control requirements to realize different functions.

The temperature sensor is in at least one of direct or indirect contact with the heating surface and the temperature sensor is configured to provide signals relating to a detected temperature to the controller. The controller is configured to vary the signal provided to the single power inverter based on the signals from the temperature sensor.

The controller is configured to vary the signal provided to the single power inverter based on a desired temperature at the first heating zone or the second heating zone. The temperature sensor is in direct or indirect contact with the heating surface and thereby positioned to directly or indirectly monitor the temperature of the surface. The temperature sensor may be disposed proximate the first induction coil or the second induction coil.

The appliance includes a structure of different temperature zones. The structure is configured as (1) a plurality of second heating zones surround the first heating zone, and/or (2) a plurality of first heating zone and second heating zones distributed in different rows or columns. The controller is configured to engage the power inverter such that the first induction coil maintains a temperature at the first heating zone that is greater than the temperature maintained by the second induction coil at the second heating zone.

To improve the user experience, a position sensor may be coupled to the controller and configured to provide signals to the controller. The controller is configured to determine the presence or absence of a food vessel within the first heating zone or the second heating zone based on the signals from the position sensor. This method can help the operator be aware the position of the heating vessels and make sure they are placed at the correct position for quality heating.

The flat plates may include glass or other nonmetallic material and may be configured to facilitate the transmission of energy from the plurality of induction coils to one or more containers disposed along the one or more flat plates.

The appliance further comprises a housing configured to at least one of enclose or support the one or more flat plates or the controller. The housing can be any shape of mechanism only to ensure the plates and controller are firmly supported.

The appliance may include at least one of a food container, a pot, or a pan disposed along the one or more flat plates The appliance may include at least one of a first food container, a first pot, or a first pan disposed in the first heating zone and at least one of a second food container, a second pot, or a second pan disposed in the second heating zone. The controller is configured to engage the single power inverter to differentially heat (a) the at least one of the first food container, the first pot, or the first pan disposed in the first heating zone and (b) the at least one of the second food container, the second pot, or the second pan disposed in the second heating zone.

Figure 31:
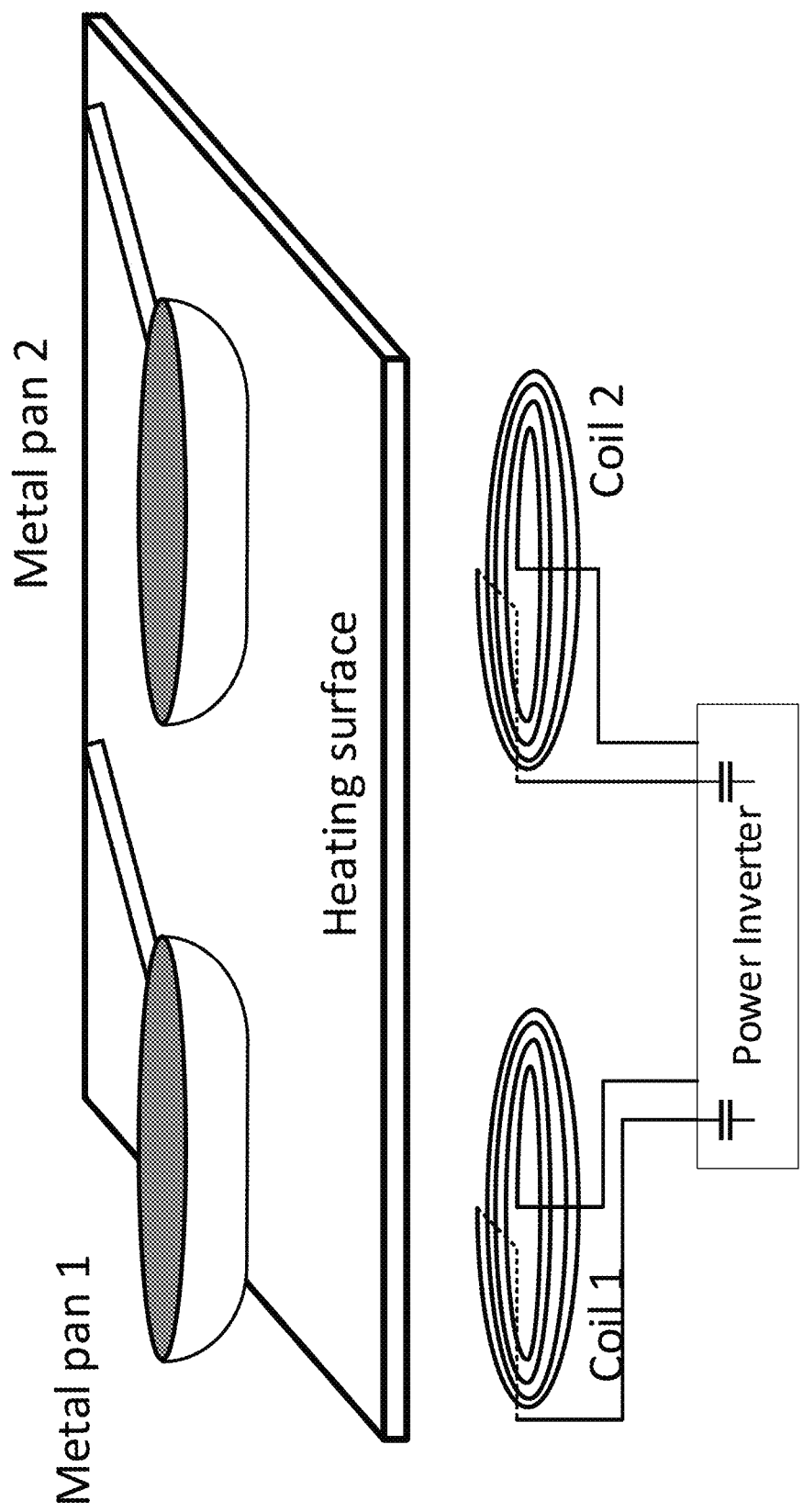
FIG. 31 is a schematic diagram of a structure of the induction heating system configured as a double omelet maker or egg maker.

FIG. 31 displays a structure of an omelet maker or the egg maker. In this structure, coil 1 and coil 2 are placed underneath the heating surface (a plate shown in FIG. 31). A metal pan 1 is placed above coil 1 on the heating surface while a metal pan 2 is placed above coil 2. Both pans can be used to cook eggs. When cooking the eggs, the temperature sensors (not shown in FIG. 31) sense the temperature and send it to the controller. The controller adjusts the power inverter to individually deliver power to coil 1 and coil 2 so as to heat the metal pans at their own temperature (can be the same or different) to cook the eggs.

Figure 32:
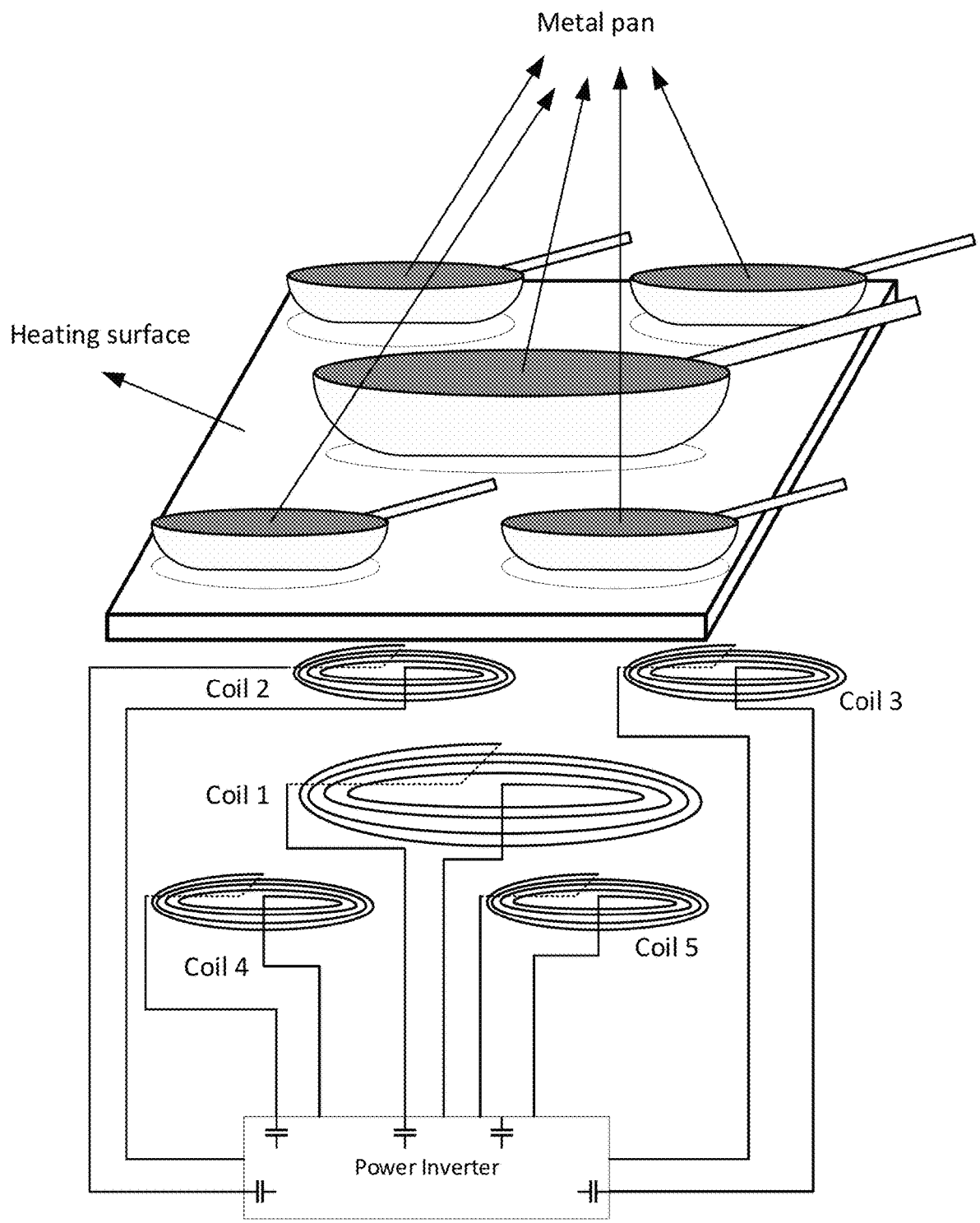
FIG. 32 is a schematic diagram of a first structure of the induction heating system configured as a French top.

FIG. 32 displays a first structure of a French hot top. In this structure, coil 2, coil 3, coil 4, and coil 5 surround the coil 1. Coil 2, coil 3, coil 4 and coil 5 in FIG. 32 have a smaller diameter and are used for lower temperature heating or warming, while coil 1 has a larger diameter and is used for cooking with higher temperature. All coils are placed underneath the heating surface (a flat surface shown in FIG.

32). There are five heating area according to the location of the coils, wherein the heating area of coil 1 (first heating zone) is bigger than the rest four areas (second heating zone). All heating area forms different heating zones. Metal pans can be placed at different heating areas. The temperature sensors (not shown in FIG. 32) sense the temperature and send it to the controller. The controller adjusts the power inverter to individually deliver power to each heating area for cooking in different pans where coil 1 delivers higher power to achieve higher temperature at first heating zone, while the other coils deliver a lower power to achieve a lower temperature at second heating zone.

Figure 33:
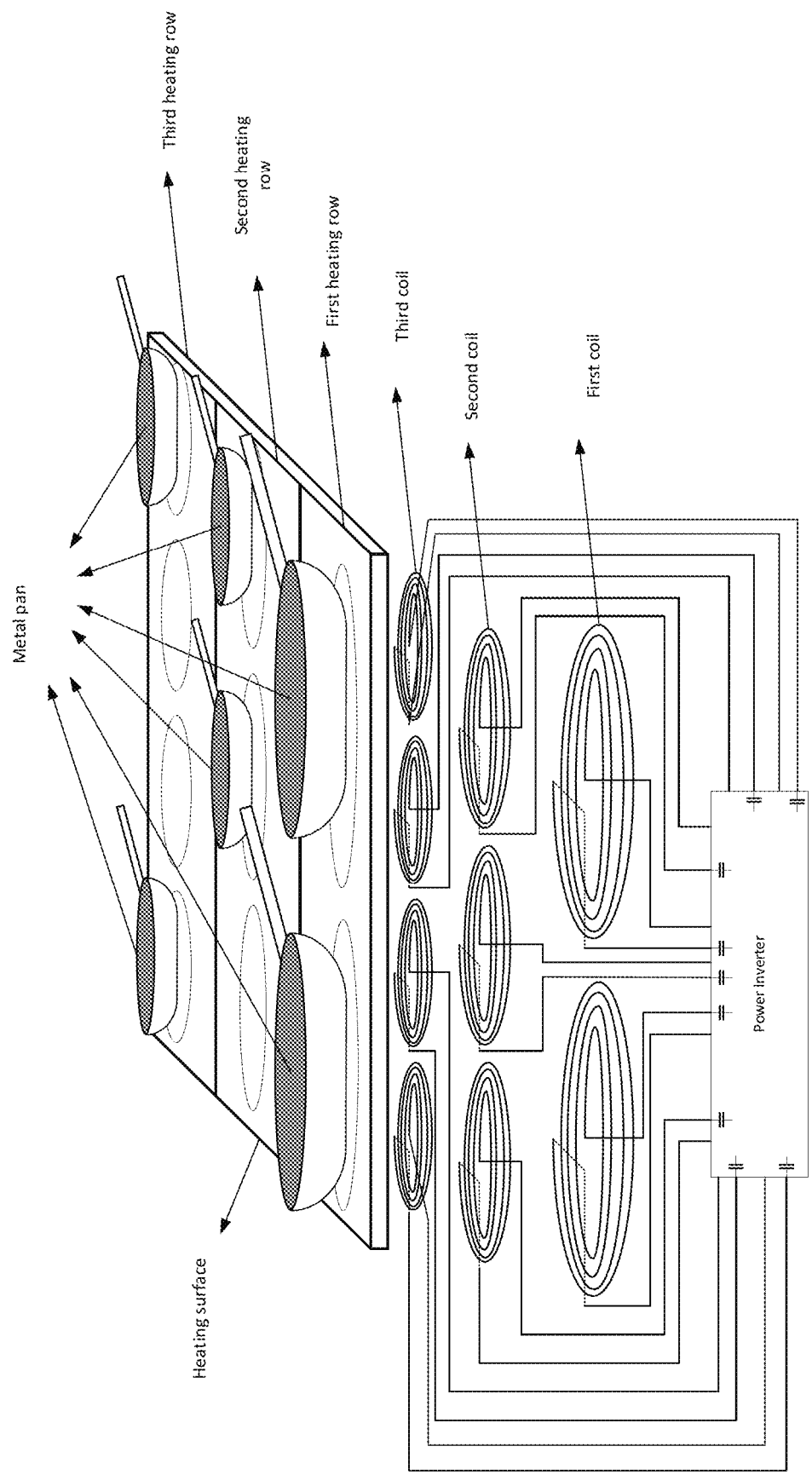
FIG. 33 is a schematic diagram of a second structure of the induction heating system configured as a French top.

FIG. 33 displays another a second structure of a French hot top. In this structure, the heating surface (a flat surface shown in FIG. 33) is separated in different zones in the form of rows. The heating surface includes a first heating row, a second heating row, and a third heating row. There are multiple heating areas in each row to form a temperature zone. Correspondingly, coils are distributed under the heating surface with the heating areas.

To simplify description, the coils for the heating areas in the first row are defined as a first coil, so are the second coil, and the third coil. In FIG. 33, the first coil has the largest diameter and is used for high temperature cooking, while the second coil has a smaller diameter and is used for middle temperature cooking, the third coil has the smallest diameter and is used for low temperature heating or warming. Metal pans can be placed at any locations according to the cooking requirement.

Specifically, during cooking, the temperature sensors (not shown in FIG. 33) sense the temperature and send it to the controller. The control adjusts the power inverter to individually deliver power to each heating area for cooking in different pans. The first coil delivers higher power to achieve higher temperature at the first heating zone, while the other coils deliver a lower power to achieve lower temperatures.

Figure 34:
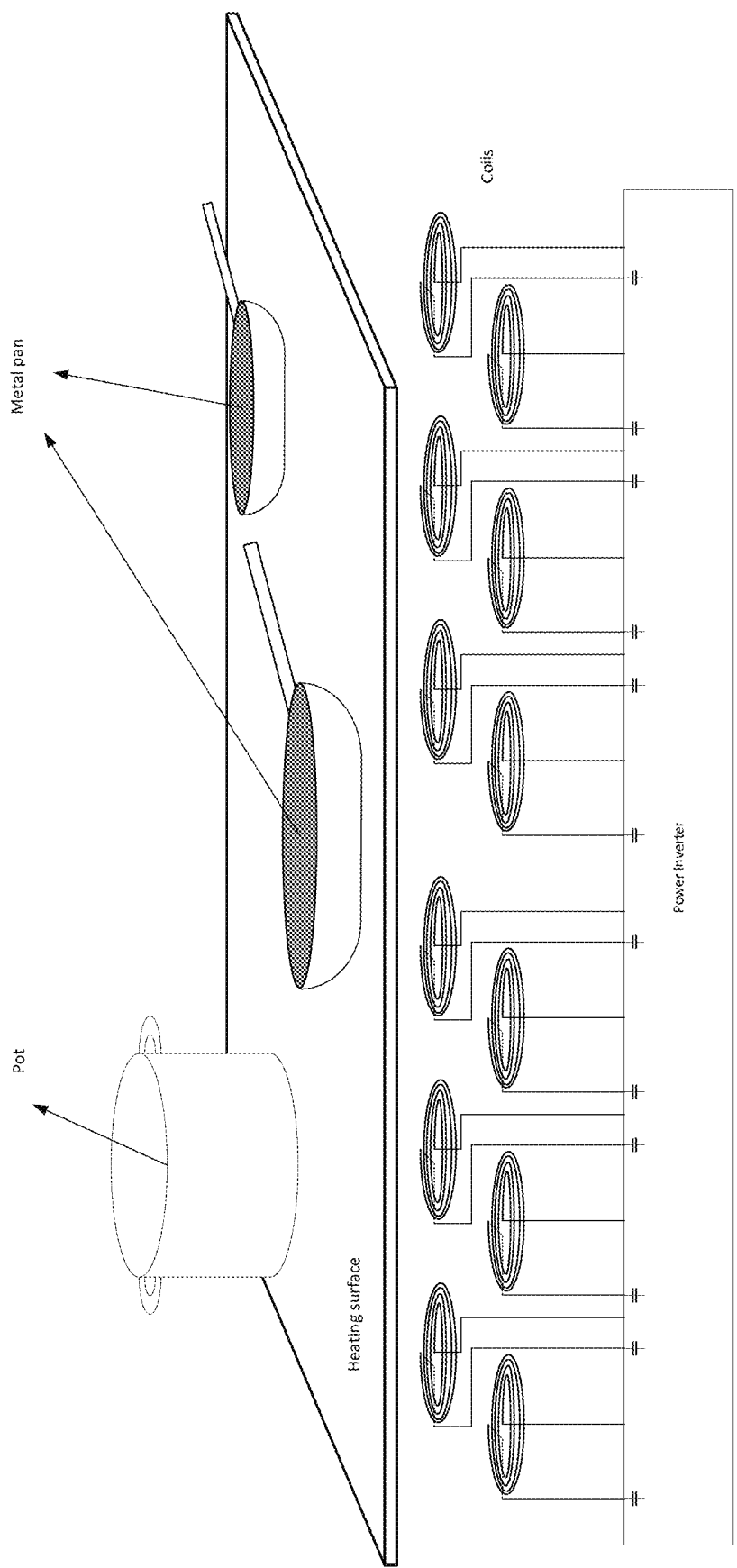
FIG. 34 is a schematic diagram of a structure of the induction heating system configured as an induction anywhere device.

FIG. 34 displays a structure of an induction anywhere device. In this structure, all coils are placed underneath the heating surface (a flat surface shown in FIG. 32) in an array where the heating surface material can be glass or other types. When metal vessels (such as a metal pan, a soup pot, etc.) are placed on top of the heating surface, the controller first acquires position signals from the position sensors at all locations. Based on the position sensors' feedback, the controller regulates the power inverter to deliver the power to the correct locations. If the temperature control at a certain location is required, the temperature sensors (not shown in FIG. 34) sense the temperature at the location and send it to the controller. The controller adjusts the inverter to individually deliver power to such location With such structure, heating all kinds compatible vessels (food vessels) on a surface made of glass or other types of materials at any location with temperature control is possible. Furthermore, the device can automatically detect the position of pan and start temperature control when it is placed on the heating surface.

At last, it should be noted that the examples mentioned above are only used for describing the technical proposal of the system of the present disclosure, rather than limitation; although we made a detailed description to the system with reference to aforesaid examples, common technicians in this field should understand that they still can modify the technical proposal documented in aforesaid examples, or replace partial or all technical features with identical features; however, such modification or replacement does not enable the nature of corresponding technical proposal to deviate from the range of technical proposal of each example.

The invention claimed is:
1. An induction heating appliance, comprising:
   a surface defining a plurality of different heating zones comprising at least a first heating zone and a second heating zone, wherein the first heating zone and the second heating zone are disposed in different locations on the surface;
   a dispenser, wherein the first heating zone is closer to the dispenser than the second heating zone;
   a plurality of induction coils including a first induction coil and a second induction coil, wherein the first induction coil is positioned to individually heat the first heating zone of the surface, wherein the second induction coil is positioned to individually heat the second heating zone of the surface;
   a plurality of capacitors including a first capacitor and a second capacitor, wherein the first induction coil is electrically connected in series with the first capacitor to form a first resonant circuit and the second induction coil is electrically connected in series with the second capacitor to form a second resonant circuit;
   a plurality of resonant circuit power switches including a first resonant circuit power switch and a second resonant circuit power switch, wherein the first resonant circuit is electrically connected in series with first resonant circuit power switch to form a first power branch and the second resonant circuit is electrically connected in series with the second resonant power switch to form a second power branch;
   a single power inverter including at least two power inverter switches, wherein the first power branch and the second power branch are electrically connected in parallel with the at least two power inverter switches of the single power inverter;
   a first switch driver coupled to the first resonant circuit power switch and the second resonant circuit power switch;
   a second switch driver coupled to the power inverter switch; and
   a controller coupled to the first switch driver and the second switch driver, the controller configured to provide signals to the first switch driver and the second switch driver to control a turn-on time of the first resonant circuit power switch, the second resonant circuit power switch, and the at least two power inverter switches to independently control a first temperature of the first heating zone and a second temperature of the second heating zone;
   wherein the controller is configured to engage the single power inverter such that the first induction coil maintains a temperature at the first heating zone that is greater than the temperature maintained by the second induction coil at the second heating zone.
2. The induction heating appliance of claim 1, further comprising a sensor coupled to the controller and configured to provide signals to the controller, wherein the controller is configured to determine the presence or absence of a food vessel within the first heating zone or the second heating zone based on the signals provided to the controller.
3. An induction heating system, comprising:
   a plurality of induction coils including a first induction coil and a second induction coil;
   a plurality of capacitors, wherein the first induction coil and the second induction coil are each electrically connected in series with one of the plurality of capacitors to form a resonant circuit;

a plurality of resonant circuit power switches, wherein the resonant circuit of the first induction coil and the resonant circuit of the second induction coil are each electrically connected in series with a single one of the plurality of resonant circuit power switches to form at least two power branches;
a single power inverter including at least two power inverter switches, wherein the at least two power branches are electrically connected in parallel with the at least two power inverter switches of the single power inverter; and
a controller configured to:
provide a signal to at least one of (a) the at least two power inverter switches or (b) the plurality of resonant circuit power switches to selectively and individually adjust a temperature associated with the plurality of induction coils;
determine a type of material of a vessel disposed in proximity with the first induction coil; and
determine the type of material of the vessel based on (a) a phase angle between signal and a current draw of the first induction coil and (b) an amplitude of the current draw of the first induction coil.

4. The induction heating system of claim 3, wherein the single power inverter comprises half-bridge topology.

5. The induction heating system of claim 3, wherein the single power inverter comprises full-bridge topology.

6. The induction heating system of claim 3, wherein the controller is configured to control an on time of at least one of the at least two power switches and thereby control the temperature associated with the respective induction coil.

7. The induction heating system of claim 3, wherein the inductance of at least one of the plurality of induction coils is 25-250 microhenries.

8. The induction heating system of claim 3, further comprising at least one driver part, wherein the driver part is connected with the resonant circuit power switch in the power branch, wherein the driver part is configured to receive the control signal from the controller and vary the turn-on time of the resonant circuit power switch to regulate the output power of the power branch.

9. The induction heating system of claim 3, wherein the at least two power inverter switches facilitate regulating the switching frequency of the single power inverter.

10. The induction heating system of claim 9, further comprising a driver part, wherein the driver part connects with the at least two power inverter switches in the single power inverter, wherein the driver part is configured to receive the control signal from the controller and vary the switching frequency of the single power inverter.

11. The induction heating system of claim 3, further comprising a plurality of current sensors, wherein each current sensor is configured to detect the current of the induction coils.

12. The induction heating system of claim 11, further comprising a signal conditioning circuit, wherein the signal conditioning circuit is configured to transfer the analog signal from the current sensors to digital signals.

13. An induction heating system, comprising:
a plurality of induction coils including a first induction coil and a second induction coil;
a plurality of capacitors, wherein the first induction coil and the second induction coil are each electrically connected in series with one of the plurality of capacitors to form a resonant circuit;
a plurality of resonant circuit power switches, wherein the resonant circuit of the first induction coil and the resonant circuit of the second induction coil are each electrically connected in series with a single one of the plurality of resonant circuit power switches to form at least two power branches;
a single power inverter including at least two power inverter switches, wherein the at least two power branches are electrically connected in parallel with the at least two power inverter switches of the single power inverter;
a controller configured to provide a signal to at least one of (a) the at least two power inverter switches or (b) the plurality of resonant circuit power switches to selectively and individually adjust a temperature associated with the plurality of induction coils;
a plurality of current sensors, wherein each current sensor is configured to detect the current of the induction coils;
a signal conditioning circuit, wherein the signal conditioning circuit is configured to transfer the analog signal from the current sensors to digital signals; and
a peak coil current detection circuit, wherein the peak coil current detection circuit is connected with both the signal conditioning circuit and the controller, wherein the peak coil current detection circuit detects the digital signal from the signal conditioning circuit and sends alarm signals to the controller when the coil current peak is greater than a preset value, wherein the controller interlocks the induction heating system based on the alarm signal.

14. An induction heating appliance, comprising:
one or more flat plates that include one or more surfaces defining a plurality of different heating zones comprising at least a first heating zone and a second heating zone, wherein the first heating zone and the second heating zone are disposed in different locations on the surface;
a plurality of induction coils including a first induction coil and a second induction coil, wherein the first induction coil is positioned to individually heat the first heating zone of the surface, wherein the second induction coil is positioned to individually heat the second heating zone of the surface;
a plurality of capacitors, wherein the first induction coil and the second induction coil are each electrically connected in series with one of the plurality of capacitors to form a resonant circuit;
a plurality of resonant circuit power switches, wherein the resonant circuit of the first induction coil and the resonant circuit of the second induction coil are each electrically connected in series with one of the plurality of resonant circuit power switches to form at least two power branches;
a single power inverter including at least two power inverter switches, wherein the at least two power branches are electrically connected in parallel with the at least two power inverter switches of the single power inverter;
a switch driver coupled to the at least two power inverter switches, the switch driver configured to provide a switch signal to the at least two power inverter switches;
a first current sensor positioned to acquire first current data regarding a first current of the first induction coil;
a second current sensor positioned to acquire second current data regarding a second current of the second induction coil; and a controller coupled to the switch driver, the first current sensor, and the second current sensor, the controller configured to:
- determine whether a first material of a first vessel in the first heating zone is compatible with the induction heating appliance based on (i) a first phase angle between the switch signal and the first current of the first induction coil and (ii) a first amplitude of the first current of the first induction coil; and
- determine whether a second material of a second vessel in the second heating zone is compatible with the induction heating system based on (i) a second phase angle between the switch signal and the second current of the second induction coil and (ii) a second amplitude of the second current of the second induction coil.

15. The induction heating appliance of claim 14, wherein the controller is configured to vary a signal provided to at least one of (a) selectively and individually turn on or turn off the at least two power branches, or (b) adjust a switching frequency of the single power inverter based on a predetermined power control algorithm, wherein the predetermined power control algorithm is configured to achieve a desired temperature at the first heating zone or the second heating zone.

16. The induction heating appliance of claim 14, further comprising at least one of a first food container, a first pot, or a first pan disposed in the first heating zone and at least one of a second food container, a second pot, or a second pan disposed in the second heating zone, wherein the controller is configured to engage the single power inverter to differentially heat (a) the at least one of the first food container, the first pot, or the first pan disposed in the first heating zone and (b) the at least one of the second food container, the second pot, or the second pan disposed in the second heating zone.

* * * * *